United States Patent
Saito et al.

(10) Patent No.: US 8,570,932 B2
(45) Date of Patent: Oct. 29, 2013

(54) WIRELESS COMMUNICATION APPARATUS

(75) Inventors: Yoshiko Saito, Kanagawa (JP); Ayako Horiuchi, Kanagawa (JP); Seigo Nakao, Kanagawa (JP); Katsuhiko Hiramatsu, Kanagawa (JP); Yuichi Kobayakawa, Osaka (JP); Atsushi Matsumoto, Ishikawa (JP)

(73) Assignee: Panasonic Corporation, Osaka (JP)

( * ) Notice: Subject to any disclaimer, the term of this patent is extended or adjusted under 35 U.S.C. 154(b) by 263 days.

(21) Appl. No.: 13/003,618

(22) PCT Filed: Jul. 10, 2009

(86) PCT No.: PCT/JP2009/003261
§ 371 (c)(1),
(2), (4) Date: Jan. 11, 2011

(87) PCT Pub. No.: WO2010/004771
PCT Pub. Date: Jan. 14, 2010

(65) Prior Publication Data
US 2011/0103297 A1      May 5, 2011

(30) Foreign Application Priority Data
Jul. 11, 2008   (JP) ................................. P2008-181906

(51) Int. Cl.
*H04B 7/14*      (2006.01)
(52) U.S. Cl.
USPC ........... 370/315; 370/429; 370/492; 370/501; 370/519; 455/11.1
(58) Field of Classification Search
USPC ......... 370/226, 227, 280, 294, 310, 315, 328, 370/332, 336, 345, 428, 429, 442, 464, 492, 370/501, 503, 516, 519, 528, 538; 455/11.1
See application file for complete search history.

(56) References Cited

U.S. PATENT DOCUMENTS

| | | | |
|---|---|---|---|
| 7,039,418 B2 * | 5/2006 | Amerga et al. | 455/456.1 |
| 8,018,893 B2 * | 9/2011 | Sartori et al. | 370/329 |
| 2003/0148732 A1 | 8/2003 | Hunter et al. | |
| 2005/0020299 A1 * | 1/2005 | Malone et al. | 455/552.1 |
| 2008/0253352 A1 * | 10/2008 | Thoukydides et al. | 370/345 |

FOREIGN PATENT DOCUMENTS

EP    1608112 A1 * 12/2005    .............. H01L 12/56

OTHER PUBLICATIONS

International Search Report for PCT/JP2009/003261 dated Aug. 14, 2009.
Todd E. Hunter, et al., Outage Analysis of Coded Cooperation; IEEE Transactions on Information Theory, vol. 52, No. 2, Feb. 2006, pp. 375-391.

* cited by examiner

*Primary Examiner* — Michael Thier
*Assistant Examiner* — Curtis A Alia
(74) *Attorney, Agent, or Firm* — Pearne & Gordon LLP

(57) ABSTRACT

A repeater capable of improving the data decoding performance at a base station while achieving sharing of processing for data exchange between repeaters and initial data transmission to the base station (eNB) is provided. A repeater 100 which cooperates with another repeater 200 to relay data to a base station 300 includes a storage section 113 which stores first data of the local apparatus, a receiving section 101 which receives at least a portion of the second data of another repeater 200, an interleave section 111 which applies interleaving to at least a portion of the first data and the second data in accordance with a difference in propagation quality between the base station 300 and each of the repeaters, and segments data after interleaving, and a transmitting section 116 which, if data after interleaving is segmented, transmits segmented data to the base station.

10 Claims, 27 Drawing Sheets

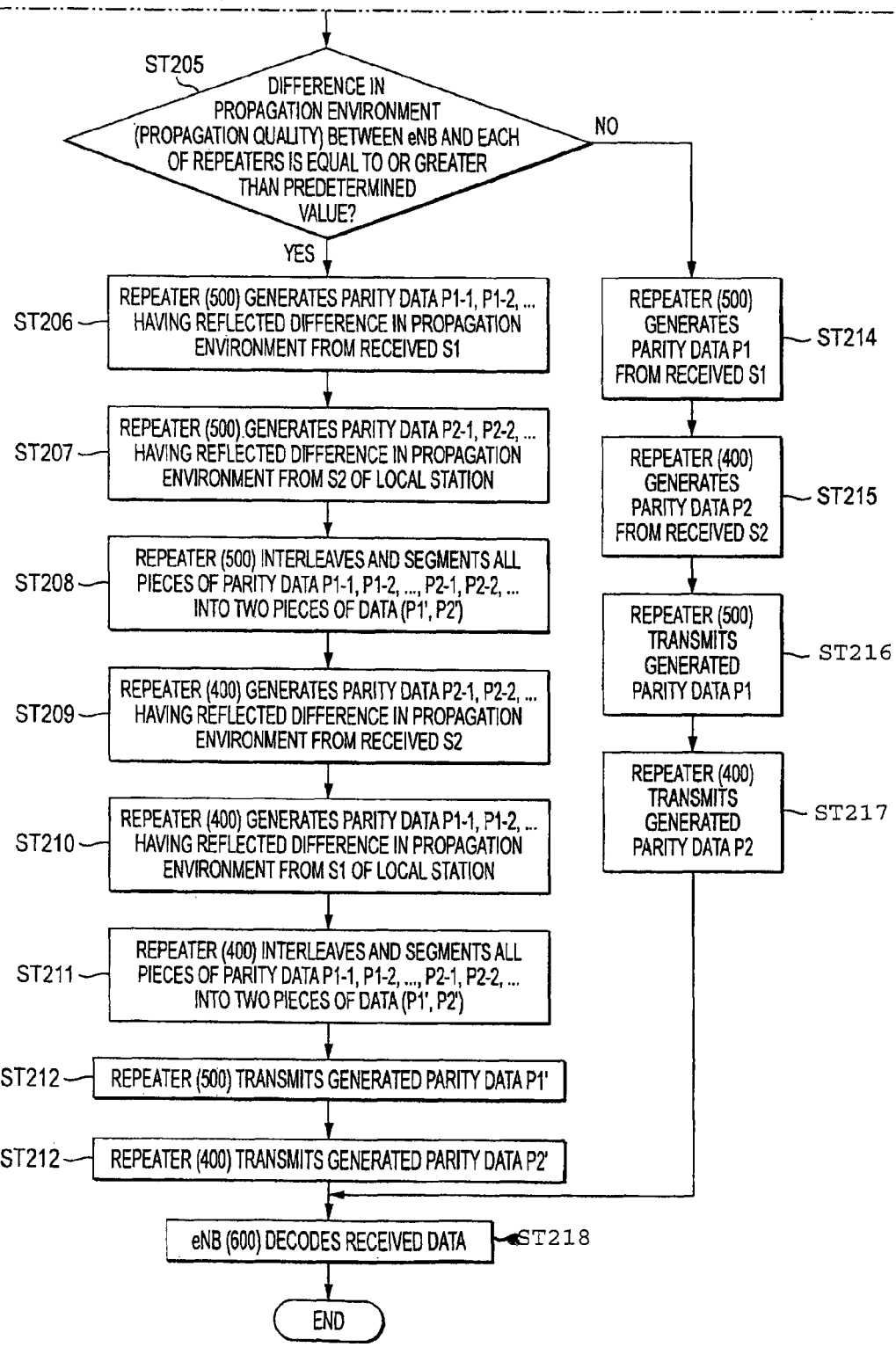

WIRELESS COMMUNICATION APPARATUS

TECHNICAL FIELD

The present invention relates to a wireless communication apparatus which cooperates with another wireless communication apparatus to relay data to a base station.

BACKGROUND ART

In recent years, in a cellular mobile communication system, with the development of information multimedia, it is common to transmit a large quantity of data, such as still image data and motion image data, as well as sound data. In order to realize transmission of a large quantity of data, studies have been actively performed as to a technique for realizing a high transmission rate using a high-frequency radio band.

However, when a high-frequency radio band is used, a high transmission rate can be achieved over a short distance, but attenuation increases depending on the transmission distance over a longer distance. Accordingly, when a mobile communication system is actually operated using a high-frequency radio band, the cover area of a wireless communication base station apparatus (hereinafter, simply referred to as a base station) decreases, requiring more base stations. More base stations are provided with commensurate cost, thus there is a demand for a technique which suppresses an increase in the number of base stations and realizes a communication service using a high-frequency radio band.

With regard to the above-described demand, a relay transmission technique has been studied: a wireless communication repeater station apparatus (hereinafter, simply referred to as a repeater) is provided between a base station and a wireless communication mobile station apparatus (hereinafter, simply referred to as a mobile station) so as to expand the cover area of the base station. Thus, communication is performed between the base station and the mobile station through the repeater. If the relay transmission technique is used, even a terminal which cannot perform direct communication with the base station can perform communication through the repeater. The mobile station may have the function of the repeater.

In the related art, in order to obtain the reception diversity effect at the base station (eNB), cooperative relay (coded cooperation) has been suggested in which a plurality of terminals (hereinafter, referred to as repeater) having a repeater function participate. Cooperative relay may be called collaborative relay or corporate relay.

FIG. 23 is a schematic view of a cooperative relay system which carries out cooperative relay between repeaters 1001 and 1002 and a base station 1003. FIG. 24 shows an operation example of the cooperative relay system of FIG. 23.

An operation example of cooperative relay which is realized by the cooperative relay system of FIG. 23 will be described focusing on the operation of the repeater 1001 of FIG. 24.

Procedure 1-1: The repeater 1001 segments transmission data to be transmitted to the base station (eNB) into two pieces of data of initial transmission data S1 including a systematic bit and parity data P1.

Procedure 1-2: The repeater 1001 transmits initial transmission data S1 to the repeater 1002 and receives initial transmission data S2 from the repeater 1002 (see FIG. 23(a)).

Procedure 1-3: The repeater 1001 generates parity data P2 from received initial transmission data S2.

Procedure 1-4: Thereafter, the repeater 1001 transmits initial transmission data S1 at the local station to the base station (eNB) 1003 (see FIG. 23(b)) and subsequently transmits generated parity data P2 to the base station (eNB) 1003 (FIG. 23(c)).

Similarly, the operation of the repeater 1002 of FIG. 24 will be described.

Procedure 2-1: The repeater 1002 segments transmission data to be transmitted to the base station (eNB) into two pieces of data of initial transmission data S2 including a systematic bit and parity data P2.

Procedure 2-2: The repeater 1002 transmits initial transmission data S2 to the repeater 1001 and receives initial transmission data S1 from the repeater 1001 (see FIG. 23(a)).

Procedure 2-3: The repeater 1002 generates parity data P1 from received initial transmission data S1.

Procedure 2-4: The repeater 1002 transmits initial transmission data S2 at the local station to the base station (eNB) 1003 (see FIG. 23(b)) and subsequently transmits generated parity data P1 to the base station (eNB) 1003 (FIG. 23(c)).

The timing of initial transmission of data at each repeater is called a first-frame, and the timing of transmission of parity data at the other station is called a second-frame.

With the above, the base station (eNB) 1003 receives two pieces of segmented data of the repeaters 1001 and 1002 through different paths (that is, cooperative relay), obtaining the path diversity effect.

As described above, when there is no significant difference in reception quality at the time of reception at the base station (eNB), cooperative relay is successful, obtaining the path diversity effect.

However, there may be a significant difference in the propagation environment (propagation quality) between the base station (eNB) 1003 and the repeater 1001 and between the base station (eNB) 1003 and the repeater 1002. In this case, a significant difference in reception quality may occur in received data of the repeaters at the base station (eNB) 1003, and as a result, the path diversity effect may not be obtained.

FIG. 25 is a schematic view of the cooperative relay system when there is a difference in the propagation environment (propagation quality) between the base station (eNB) 2003 and each of the repeaters 2001 and 2002. FIG. 26 shows an operation example of the cooperative relay system of FIG. 25.

In the cooperative relay system of FIG. 25, it is assumed that the propagation environment (propagation quality) between the base station (eNB) 2003 and the repeater 2002 is poor.

An operation example of cooperative relay which is realized by the cooperative relay system of FIG. 26 will be described focusing on the operation of the repeater 2001 of FIG. 25.

Procedure 1-1: The repeater 2001 segments transmission data to be transmitted to the base station (eNB) into two pieces of data of initial transmission data S1 including a systematic bit and parity data P1.

Procedure 1-2: The repeater 2001 transmits initial transmission data S1 to the repeater 2002 and receives initial transmission data S2 from the repeater 2002 (see FIG. 25(a))

Procedure 1-3: The repeater 2001 generates parity data P2 from received initial transmission data S2.

Procedure 1-4: Thereafter, the repeater 2001 transmits initial transmission data S1 at the local station to the base station (eNB) 2003 (see FIG. 25(b)) and subsequently transmits generated parity data P2 to the base station (eNB) 2003 (FIG. 25(c)).

Similarly, the operation of the repeater 2002 of FIG. 25 will be described.

Procedure 2-1: The repeater 2002 segments transmission data to be transmitted to the base station (eNB) 2003 into two pieces of data of initial transmission data S2 including a systematic bit and parity data P2.

Procedure 2-2: The repeater 2002 transmits initial transmission data S2 to the repeater 2001 and receives initial transmission data S1 from the repeater 2001 (see FIG. 23(a)).

Procedure 2-3: The repeater 2002 generates parity data P1 from received initial transmission data S1.

Procedure 2-4: The repeater 2002 transmits initial transmission data S2 at the local station to the base station (eNB) 2003. However, since the propagation environment (propagation quality) between the base station (eNB) 2003 and the repeater 2002 is poor, the reception quality of initial transmission data S2 at the base station (eNB) 2003 is degraded and in the worst case, initial transmission data S2 may not be received (see FIG. 25(b)). Similarly, the repeater 2002 transmits generated parity data P1 to the base station (eNB). However, since the propagation environment (propagation quality) between the base station (eNB) 2003 and the repeater 2002 is poor, the reception quality of parity data P1 at the base station (eNB) 2003 is degraded and in the worst case, parity data P1 may not be received (FIG. 25(c)).

As described above, when there is a significant difference in the propagation environment (propagation quality) between the base station (eNB) 2003 and the repeater 2001 and between the base station (eNB) 2003 and the repeater 2002, a significant difference in reception quality may occur in received data of the repeaters at the base station (eNB) and as a result, the path diversity effect may not be obtained.

CITATION LIST

Patent Literature

PTL 1: U.S. Patent Publication No. 2003/0148732A1

SUMMARY OF INVENTION

Technical Problem

An object of the invention is to provide a wireless communication apparatus capable of improving the decoding performance of data to be transmitted from wireless communication apparatuses to a base station while achieving sharing of processing for data exchange between wireless communication apparatuses participating in cooperative relay and initial data transmission from the wireless communication apparatuses to the base station (eNB).

Solution to Problem

A first aspect of the invention provides a wireless communication apparatus that cooperates with another wireless communication apparatus to relay data to a base station, the wireless communication apparatus comprising:

a storage section that stores first data to be transmitted from the wireless communication apparatus;

a receiving section that receives at least a portion of second data to be transmitted by the another wireless communication apparatus;

a relay data processing section that compensates for at least a portion of the first data and the second data for cooperative relay in accordance with a difference in propagation quality between the base station and each of the wireless communication apparatuses; and a transmitting section that transmits data which has been processed by the relay data processing section to the base station.

With this wireless communication apparatus, it is possible to improve the decoding performance of data to be transmitted from the wireless communication apparatuses at the base station (eNB) while achieving sharing of data exchange between the wireless communication apparatuses and transmission of initial transmission data to the base station.

A second aspect of the invention provides a wireless communication apparatus that cooperates with another wireless communication apparatus to relay data to a base station. The wireless communication apparatus includes a storage section that stores first data to be transmitted from the local wireless communication apparatus, a receiving section that receives at least a portion of second data to be transmitted by the another wireless communication apparatus, an interleave section that applies interleaving to at least a portion of the first data and the second data in accordance with a difference in propagation quality between the base station and each of the wireless communication apparatuses, and a transmitting section that transmits data which has been interleaved to the base station.

With this wireless communication apparatus, it is possible to improve the decoding performance of data to be transmitted from the wireless communication apparatuses at the base station (eNB) while achieving sharing of data exchange between the wireless communication apparatus and transmission of initial transmission data to the base station.

In the wireless communication apparatus, each of the first data and the second data is constituted by initial transmission data including a systematic bit and parity data including a parity bit. The wireless communication apparatus further includes a determination section that determines whether a difference in propagation quality between the base station and each of the wireless communication apparatuses is equal to or greater than a predetermined value or not from propagation quality between the base station and the wireless communication apparatus and propagation quality between the base station and the another wireless communication apparatus, and a data generating section that generates parity data from the initial transmission data. When the determination section determines that the difference in propagation quality between the base station and each of the wireless communication apparatuses is equal to or greater than the predetermined value, the relay data processing section applies interleaving to the initial transmission data of the first data, the parity data of the first data, the initial transmission data of the second data received by the receiving section, and the parity data of the second data generated by the data generating section, and the transmitting section transmits data which ha been interleaved to the base station.

With this wireless communication apparatus, even when the propagation environment (propagation quality) between the base station (eNB) and one of the wireless communication apparatuses is poor, data is randomized, such that the base station (eNB) can receive data transmitted from the wireless communication apparatuses with no deviation, improving reception quality at the base station (eNB).

A third aspect of the invention provides a wireless communication apparatus that cooperates with another wireless communication apparatus to relay data to a base station, the wireless communication apparatus comprising:

a storage section that stores first data transmitted from the wireless communication apparatus and constituted by first initial transmission data including a systematic bit and first parity data including a parity bit;

a receiving section that receives second initial transmission data transmitted from the another wireless communication apparatus, and the second initial transmission data including a systematic bit;

a determination section that determines whether a difference in propagation quality between the base station and each of the wireless communication apparatuses is equal to or greater than a predetermined value or not based on propagation quality between the base station and the wireless communication apparatus and propagation quality between the base station and the another wireless communication apparatus;

a data generating section that, when the determination section determines that the difference in propagation quality between the base station and each of the wireless communication apparatuses is equal to or greater than the predetermined value, generates parity data of the first data, in which the difference in propagation quality between the base station and each of the wireless communication apparatuses is reflected, and parity data of the second data, in which the difference in propagation quality between the base station and each of the wireless communication apparatuses is reflected, from the first initial transmission data of the first data and the second initial transmission data transmitted from the another wireless communication apparatus;

an interleave section that applies interleaving to the parity data of the first data generated by the data generating section and the parity data of the second data generated by the data generating section; and a transmitting section that transmits data which has been interleaved by the interleave section to the base station.

In the wireless communication apparatus, the quantities of the parity data of the first data generated by the data generating section and the parity data of the second data generated by the data generating section reflect the difference in propagation quality between the base station and each of the wireless communication apparatuses.

In the wireless communication apparatus, the quantity of the first initial transmission data of the first data in transmitting the first initial transmission data of the first data to the base station reflects the difference in propagation quality between the base station and each of the wireless communication apparatuses.

With this wireless communication apparatus, it is possible to improve the decoding performance of data to be transmitted from the wireless communication apparatuses to the base station while achieving sharing of processing for data exchange between the wireless communication apparatuses participating in cooperative relay and initial data transmission from the wireless communication apparatuses participating in cooperative relay to the base station (eNB). Even when the propagation environment (propagation quality) between the base station (eNB) and one of the wireless communication apparatuses is poor, data is randomized, such that repeater data is not deviated at the base station (eNB), improving reception quality at the base station (eNB).

A fourth aspect of the invention provides a wireless communication apparatus that cooperates with another wireless communication apparatus to relay data to a base station, the wireless communication apparatus comprising:

a storage section that stores first data to be transmitted from the wireless communication apparatus;

a receiving section that receives second data to be transmitted from the another wireless communication apparatus;

a first determination section that determines whether a difference in propagation quality between the base station and each of the wireless communication apparatuses is equal to or greater than a predetermined value or not based on propagation quality between the base station and the wireless communication apparatus and propagation quality between the base station and the another wireless communication apparatus;

a second determination section that determines which of propagation quality between the base station and the wireless communication apparatus and propagation quality between the base station and the another wireless communication apparatus is satisfactory;

a data generating section that generates first parity data from the first data on the basis of the determination results of the first determination section and the second determination section, and generates second parity data from the second data on the basis of the determination results of the first determination section and the second determination section;

a first interleave section that interleaves the first data and the second data;

a second interleave section that interleaves the first parity data generated by the data generating section and the second parity data generated by the data generating section in accordance with information regarding the difference in propagation quality between the base station and each of the wireless communication apparatuses; and a transmitting section that transmits at least a portion of the first data which has been interleaved, the second data which has been interleaved, the first parity data which has been interleaved, and the second parity data which has been interleaved to the base station.

With this wireless communication apparatus, it is possible to improve the decoding performance of data to be transmitted from the wireless communication apparatuses to the base station while achieving sharing of processing for data exchange between the wireless communication apparatuses participating in cooperative relay and initial data transmission from the wireless communication apparatuses participating in cooperative relay to the base station (eNB). Even when the propagation environment (propagation quality) between the base station (eNB) and one of the wireless communication apparatuses is poor, data is randomized, such that repeater data is not deviated at the base station (eNB), improving reception quality at the base station (eNB).

Advantageous Effects of Invention

It is possible to improve the decoding performance of data to be transmitted from the wireless communication apparatuses to the base station while achieving sharing of processing for data exchange between the wireless communication apparatuses participating in cooperative relay and initial data transmission from the wireless communication apparatuses participating in cooperative relay to the base station (eNB).

BRIEF DESCRIPTION OF DRAWINGS

FIG. 5(a) is a diagram showing the interior structure of a received data memory and FIG. 5(b) is a diagram showing the interior structure of a transmission data memory.

FIG. 13(a) is a diagram showing the interior structure of a received data memory and FIG. 13(b) is a diagram showing the interior structure of a transmission data memory.

FIG. 20(a) is a diagram showing the interior structure of a received data memory and FIG. 20(b) is a diagram showing the interior structure of a transmission data memory.

DESCRIPTION OF EMBODIMENTS

Hereinafter, embodiments of the invention will be described with reference to the drawings.

In the embodiments of the invention, a wireless communication apparatus having a repeater function, that is, a wireless communication apparatus which can cooperate with another wireless communication apparatus to transmit data to a base station is simply referred to as a "repeater".

(First Embodiment)

In a first embodiment, repeaters segment data to be transmitted to a base station into initial transmission data (hereinafter, represented by Sx) including a systematic bit and transmission data (hereinafter, represented by Px) including a parity bit, exchange initial transmission data S1 and S2 with each other, and respectively generates parity data P2 and P1 for the other station. Relay data processing is performed for compensating for data of at least a portion of data to be transmitted from one repeater to the base station and data to be transmitted from another repeater to the base station for cooperative relay in accordance with the difference in propagation quality between the base station and each of the wireless communication apparatuses. Specifically, when it is determined that the difference in the propagation environment (propagation quality) between each of the repeaters and the base station on the basis of control information including resource allocation, propagation environment (propagation quality) notification, and the like from the base station (eNB) in advance, the repeaters 100 and 200 interleave all pieces of data of initial transmission data (S1 and S2) and parity data (P1 and P2) for the local station and the other station. All pieces of interleaved data are segmented into four pieces of data (D1, D2, D3, and D4). The repeaters 100 and 200 respectively transmit two different pieces of data out of four pieces of segmented data to the base station (eNB) in a first-frame and a second-frame.

With the above-described cooperative relay, even when the propagation environment (propagation quality) between the base station (eNB) and one of the repeaters is poor, transmission data is randomized, such that data received from the repeaters is not deviated at the base station (eNB), improving reception quality at the base station (eNB).

Figure 1:
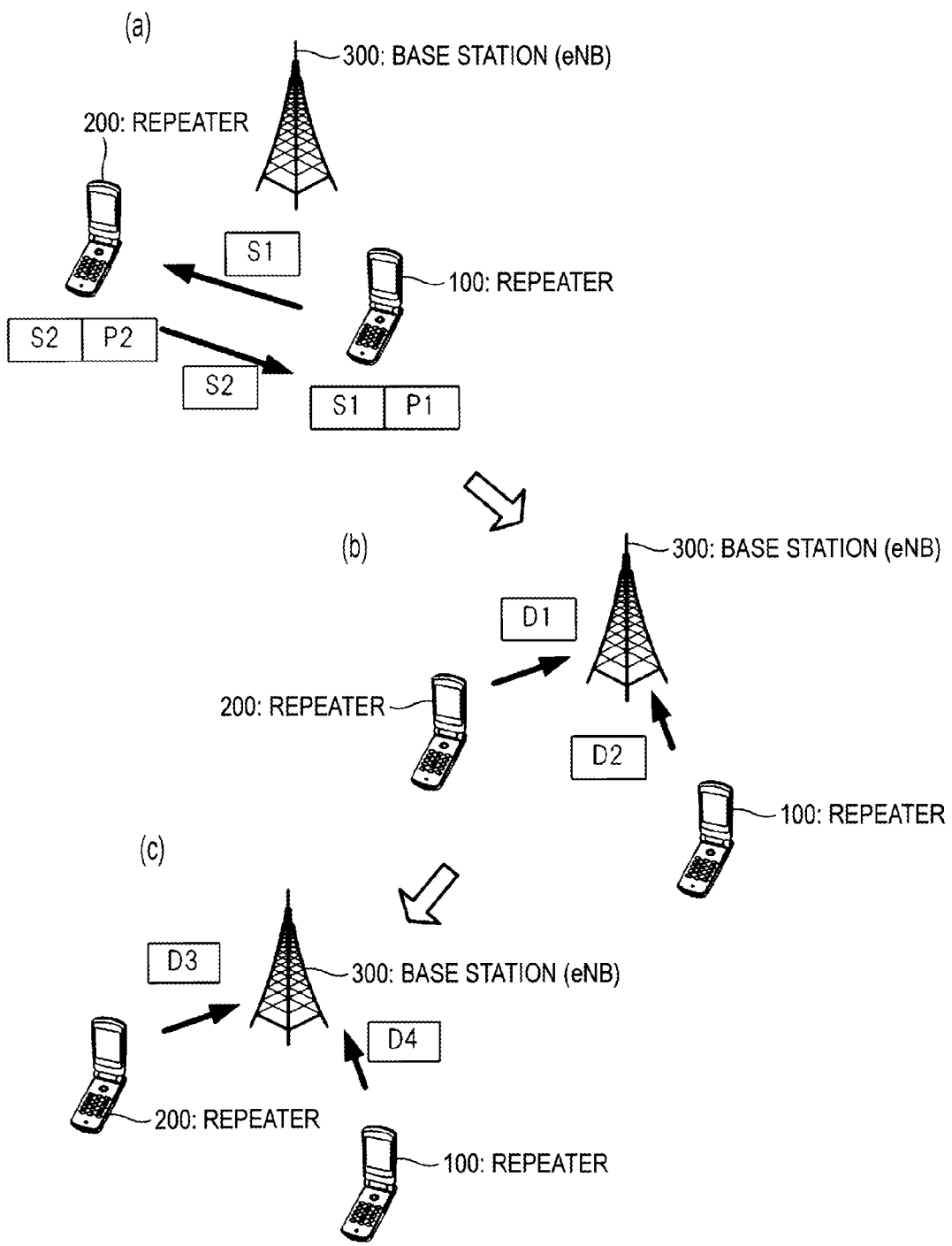
FIG. 1 is a schematic view of a cooperative relay system according to a first embodiment.
Figure 2:
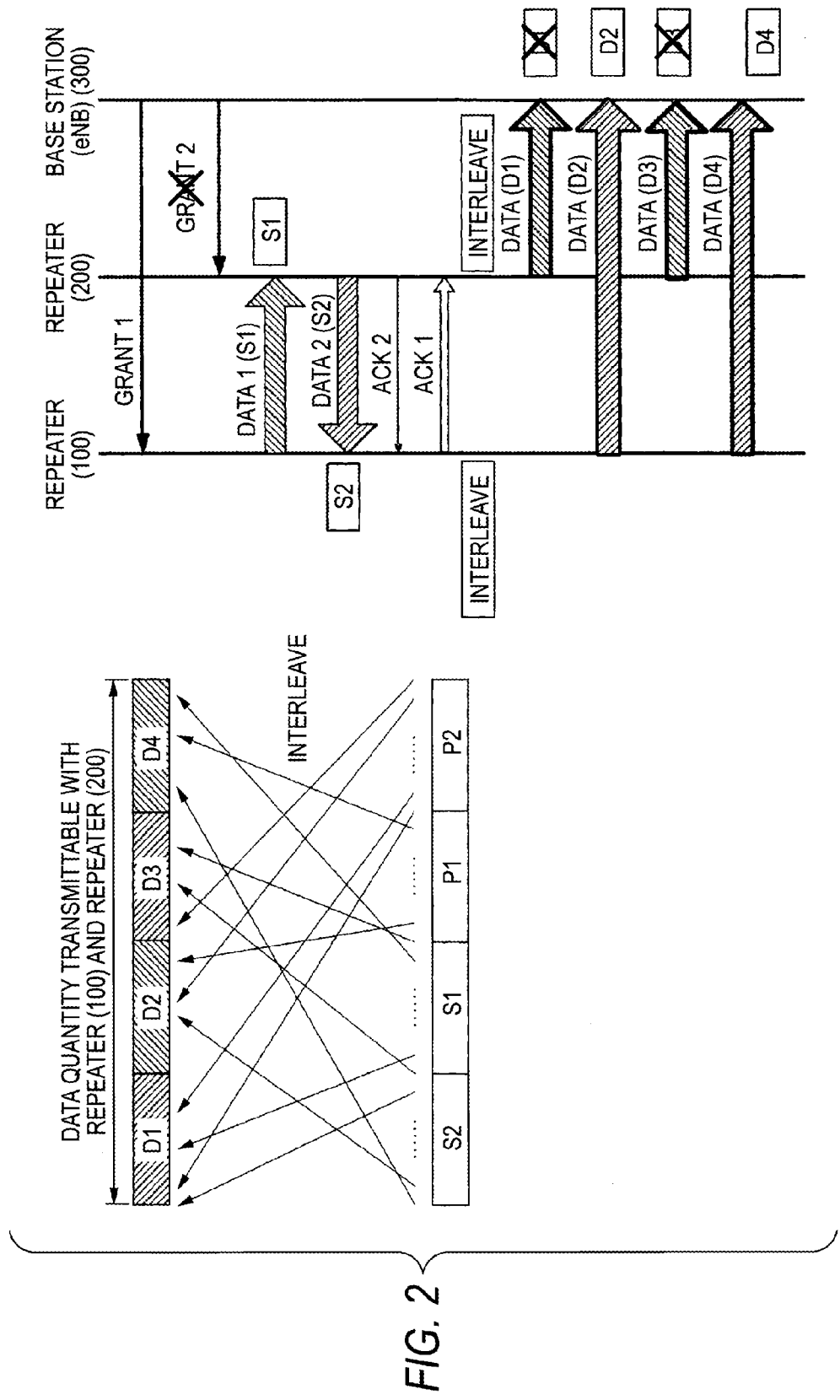
FIG. 2 is a sequence diagram of cooperative relay of FIG. 1.
Figure 3:
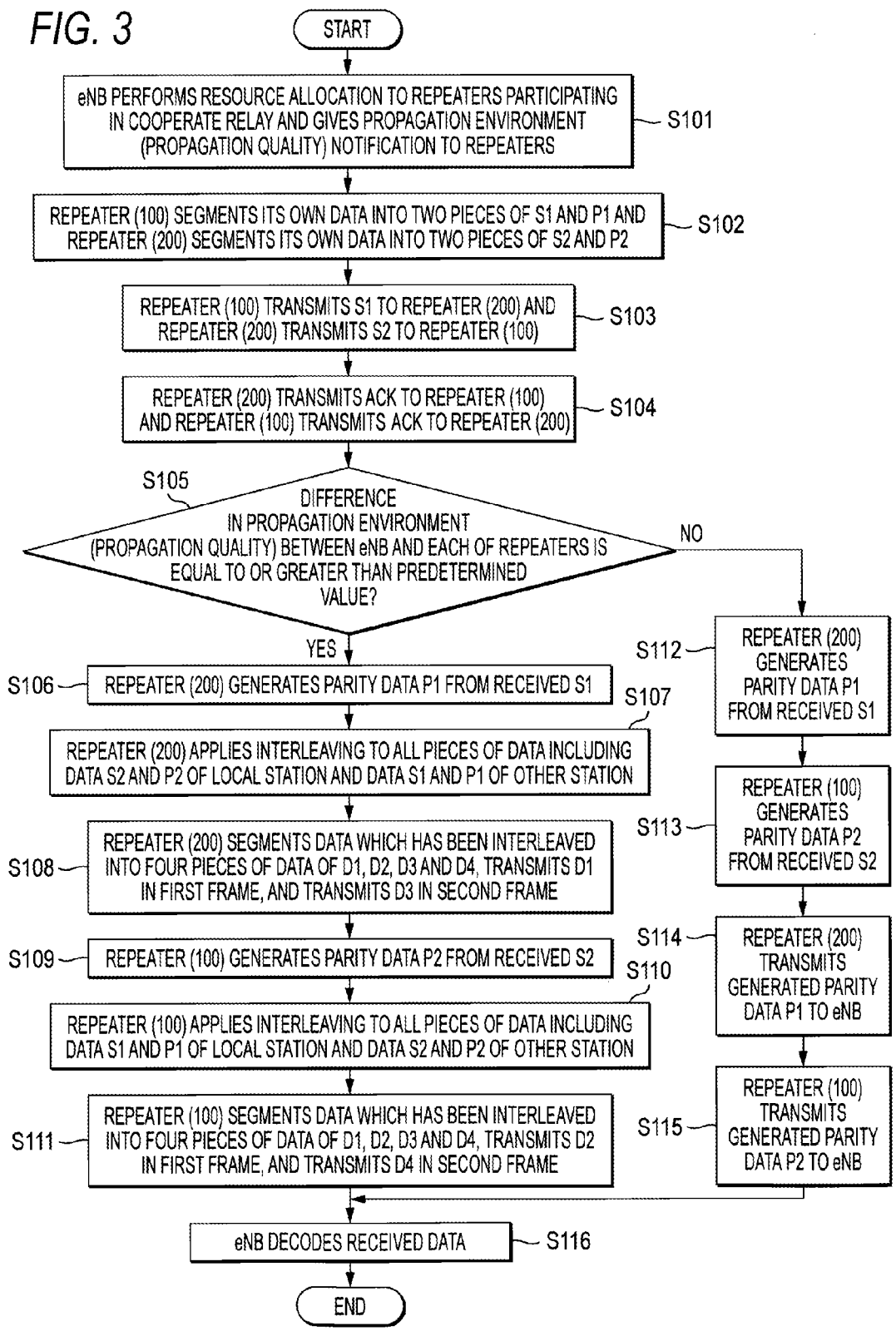
FIG. 3 is a diagram showing the processing flow of cooperative relay of FIG. 1.

FIG. 1 is a schematic view of a cooperative relay (Coded Cooperation) system according to the first embodiment. In the first embodiment, as shown in FIG. 1, cooperative relay is carried out to relay initial transmission data S1 and S2 from the repeaters 100 and 200 to the base station (eNB) 300. In the cooperative relay system of FIG. 1, although the propagation environment (propagation quality) between the base station (eNB) 300 and the repeater 200 is poor, the invention is not limited thereto. In the first embodiment, it should suffice that there is a difference in the propagation environment (propagation quality) between the base station (eNB) and each of the repeaters. FIG. 2 is a sequence diagram of cooperative relay of FIG. 1. FIG. 3 is a diagram showing the processing flow of cooperative relay of FIG. 1.

An operation example of the first embodiment will be described with reference to FIG. 2.

Procedure 1: The base station (eNB) 300 gives resource allocation and propagation environment (propagation quality) notification to the repeaters 100 and 200 participating in cooperative relay. In the first embodiment, control information including resource allocation, propagation environment (propagation quality) notification, and the like is included in grant information and can be shared by the repeaters 100 and 200 participating in cooperative relay.

Procedure 2: Each of the repeaters 100 and 200 segments data of the local station for cooperative relay into two pieces of data. In the first embodiment, description will be provided as to a case where data of the local station for cooperative relay is segmented into two pieces of data of initial transmission data Sx including a systematic bit and transmission data Px including a parity bit (x corresponds to a repeater number).

Procedure 3: The repeaters 100 and 200 exchange initial transmission data S1 and S2 with each other and respectively generate parity data P2 and P1.

Procedure 4: The repeaters 100 and 200 respectively interleave and segment all pieces of data of initial transmission data S1 and S2 and parity data P1 and P2 into four pieces of data (D1, D2, D3, and D4).

Procedure 5: The repeaters respectively transmit two different pieces of data out of the four pieces of segmented data in the first-frame and the second-frame.

In the first-frame (see FIG. 1(b)), out of the four pieces of segmented data D1, D2, D3, and D4, the repeater 100 transmits D1 to the base station 300 and the repeater 200 transmits D2 to the base station 300. Subsequently, in the second-frame (FIG. 1(c)), the repeater 100 transmits data D3 to the base station 300 and the repeater 200 transmits data D4 to the base station 300.

With the above-described operation, even when the propagation environment (propagation quality) between the base station (eNB) and one of the repeaters is poor, data is randomized, such that repeater data is not deviated at the base station (eNB), improving reception quality at the base station (eNB).

In addition to control information including the determination of propagation quality being included in grant information from the base station (eNB), when propagation quality is equal to or greater than a predetermined value, NACK from the base station (eNB) may be set to be soft NACK, and propagation quality information may be included in NACK. The initial transmission data is not limited to a systematic bit, and may be self-decodable data.

Next, processing for cooperative relay of the repeaters 100 and 200 and the base station (eNB) according to the first embodiment will be described with reference to FIG. 3.

First, the base station (eNB) gives resource allocation and propagation environment (propagation quality) notification to the repeaters 100 and 200 participating in cooperative relay (Step S101). Next, the repeaters 100 and 200 respectively segment data S1 and S2 at the local station for cooperative relay into two pieces of data (Step S102).

The repeater 100 transmits initial transmission data S1 of the local station to the repeater 200 and the repeater 200 transmits initial transmission data S2 of the local station to the repeater 100 (Step S103). Next, each of the repeaters 100 and 200 transmits, to the other station, an ACK/NACK signal indicating whether or not the local station has received initial transmission data of the other station (Step S104).

It is determined whether a difference in the propagation environment (propagation quality) between each of the repeaters 100 and 200 and the base station is equal to or greater than a predetermined value or not from propagation quality information between the repeater 100 and the base station 300 and propagation quality information between the repeater 200 and the base station 300 (Step S105). When the difference in the propagation environment (propagation quality) between each of the repeaters and the base station is equal to or greater than the predetermined value, the repeater 200 generates parity data P1 from received S1 (Step S106) and applies interleaving to all pieces of data including data S2 and P2 of the local station and data S1 and P1 of the other station (Step S107). Then, the repeater 200 segments data after interleaving into four pieces of data D1, D2, D3, and D4, transmits D1 in the first frame, and transmits D3 in the second frame (Step S108). Meanwhile, the repeater 100 generates parity data P2 from received initial transmission data S2 (Step S109) and applies interleaving to all pieces of data including data S1 and P1 of the local station and data S2 and P2 of the other station (Step S110). Then, the repeater 100 segments data after interleaving into four pieces of data D1, D2, D3, and D4, transmits D2 in the first frame, and transmits D4 in the second frame (Step S111).

When the difference in the propagation environment (propagation quality) between each of the repeaters and the base station is smaller than the predetermined value, the repeater 200 generates parity data P1 from received S1 and transmits generated parity data P1 (Steps S112 and S114). Meanwhile, the repeater 100 generates parity data P2 from received S2 and transmits generated parity data P2 (Steps S113 and S115). Then, transmission data generated by each repeater is transmitted to the base station (eNB) and decoded (Step S116).

Next, the operation of the repeater 100 will be described.

Figure 4:
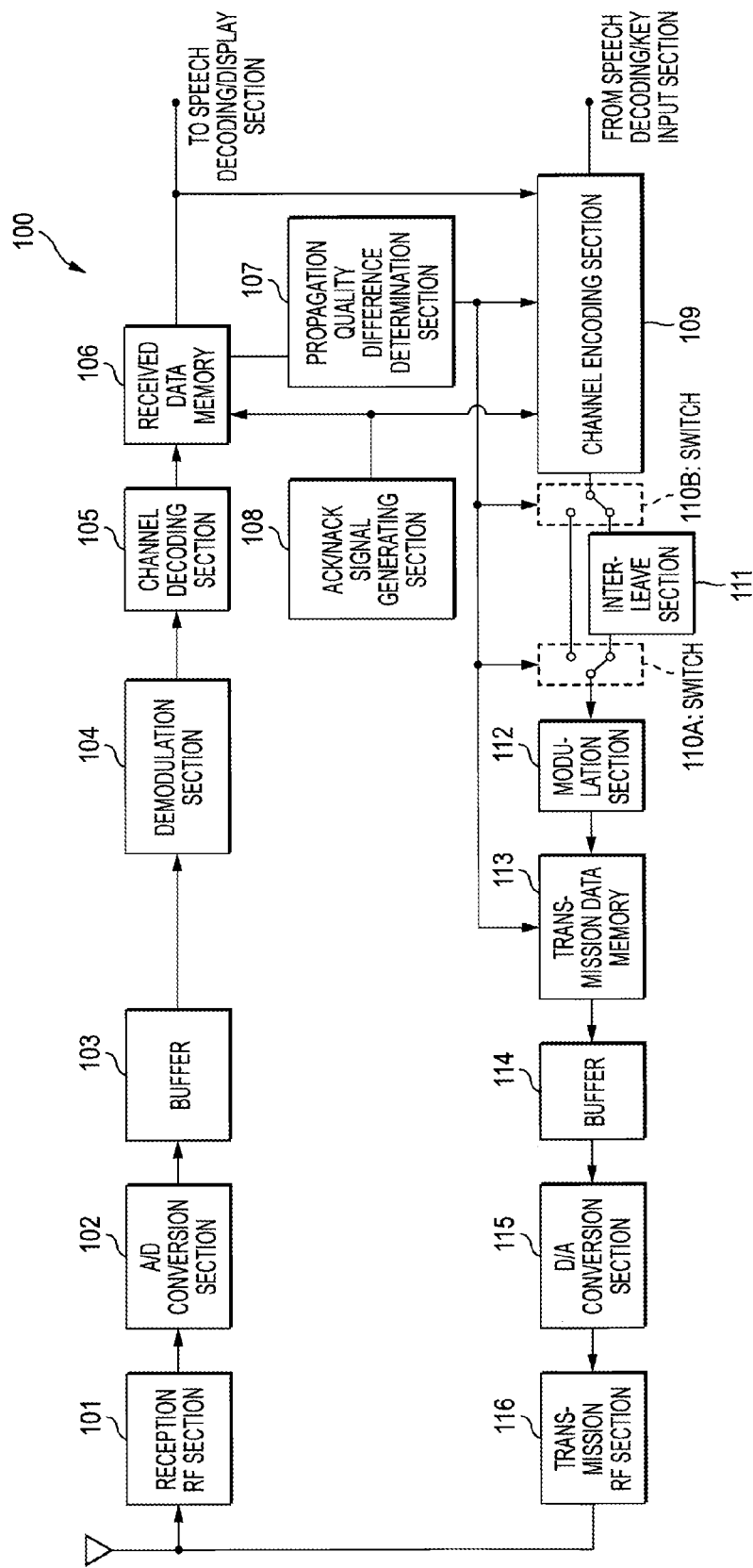
FIG. 4 is a functional block diagram of a repeater 100 according to the first embodiment.

FIG. 4 is a functional block diagram of the repeater 100 according to the first embodiment. The repeater 100 includes a reception RF section 101, an A/D conversion section 102, buffers 103 and 114, a demodulation section 104, a channel decoding section 105, a received data memory 106, a propagation quality difference determination section 107, an ACK/NACK signal generating section 108, a channel encoding section 109, switches 110A and 110B, an interleave section 111, a modulation section 112, a transmission data memory 113, a D/A conversion section 115, and a transmission RF section 116.

Figure 5:
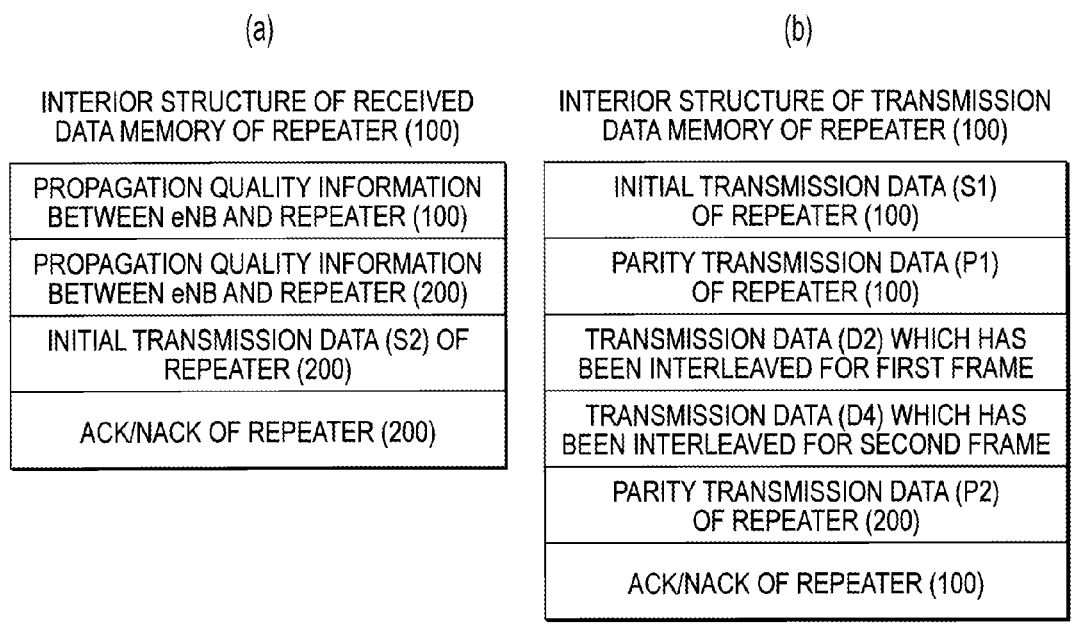
FIG. 5 shows the memory interior structure of the repeater 100 according to the first embodiment, specifically.

An operation until the repeater 100 completes transmission of one block of data through cooperative relay will be described with reference to FIGS. 2 to 5. FIG. 5 is a diagram showing the interior structure of a memory of the repeater 100. FIG. 5(a) is a diagram showing the interior structure of a received data memory, and FIG. 5(b) is a diagram showing the interior structure of a transmission data memory.

First, the repeater 100 receives "propagation quality information from the base station (eNB) 300 toward the repeater 100 and propagation quality information from the base station (eNB) 300 toward the repeater 200" from the base station (eNB) 300 by the reception RF section 101.

A signal received from the base station (eNB) 300 is downconverted to a baseband by the reception RF section 101 and input to the A/D conversion section 102. The signal input to the A/D conversion section 102 is converted to a digital signal and accumulated in the buffer 103. Then, a signal including propagation quality information is subjected to demodulation processing by the demodulation section 104 and channel decoding processing by the channel decoding section 105, and stored by the received data memory 106.

The repeater 100 segments transmission data of the local station into initial transmission data S1 including a systematic bit and parity transmission data P1 including a parity bit, and retains initial transmission data S1 and parity transmission data P1 in the transmission data memory 113. Then, the repeater 100 reads initial transmission data S1 from the transmission data memory 113 and accumulates initial transmission data S1 in the buffer 114. Thereafter, initial transmission data S1 is D/A converted by the D/A conversion section 115, upconverted to a signal in an RF band by the transmission RF section 116, and transmitted from a transmitting antenna to the base station (eNB) 300.

Subsequently, the repeater 100 receives initial transmission data S2 from the repeater 200 by the reception RF section 101. Received initial transmission data S2 is downconverted to a baseband by the reception RF section 101 and input to the A/D conversion section 102. The signal input to the A/D conversion section 102 is converted to a digital signal and accumulated in the buffer 103. Then, the signal of initial transmission data S2 is subjected to demodulation processing by the demodulation section 104 and channel decoding processing by the channel decoding section 105, and stored in the received data memory 106.

The ACK/NACK signal generating section 108 generates the ACK/NACK signal of the repeater 100 in accordance with the channel decoding result (CRC or the like) of initial transmission data S2 of the repeater 200. When reception is successful, the ACK signal is generated, and when reception fails, the NACK signal is generated. The ACK signal or the NACK signal of the repeater 100 generated by the ACK/NACK signal generating section 108 is subjected to channel encoding processing by the channel encoding section 109 and modulation processing by the modulation section, and stored in the transmission data memory 113. Then, the ACK/NACK signal of the repeater 100 is read from the transmission data memory 113 and accumulated in the buffer 114. Thereafter, the ACK/NACK signal of the repeater 100 is D/A converted by the D/A conversion section 115, upconverted to a signal in an RF band by the transmission RF section 116, and transmitted from the transmitting antenna.

Subsequently, the ACK/NACK signal from the repeater 200 is received by the reception RF section 101. The received ACK/NACK signal is downconverted to a baseband by the reception RF section 101 and input to the A/D conversion section. The signal input to the ND conversion section is converted to a digital signal and accumulated in the buffer 103. Then, the ACK/NACK signal from the repeater 200 is subjected to demodulation and channel decoding processing, and is stored in the received data memory 106.

Subsequently, the propagation quality information between the base station (eNB) and the repeater 100 and the propagation quality information between the base station (eNB) and the repeater 200 stored in the received data memory 106 are read, and the propagation quality difference determination section 107 calculates the difference in propagation quality between the base station (eNB) and each of the repeaters and determines whether or not the difference is equal to greater than a predetermined value.

When the difference in propagation quality between the base station (eNB) and each of the repeaters calculated by the propagation quality difference determination section 107 is equal to or greater than the predetermined value, the switches 110A and 110B between the channel encoding section 109 and the modulation section 112 are controlled by the interleave section 111.

Meanwhile, when the difference in propagation quality between the base station (eNB) and each of the repeaters calculated by the propagation quality difference determination section 107 is smaller than the predetermined value, the switches 110A and 110B between the channel encoding section 109 and the modulation section 112 are switched such that data passes through a path not including the interleave section 111. The calculated propagation quality difference information is also output to the channel encoding section 109.

Subsequently, decoded data of initial transmission data S2 stored in the received data memory 106 is read. When the difference in propagation quality calculated by the propagation quality difference determination section 107 is equal to or greater than the predetermined value, the channel encoding section 109 generates encoded data of initial transmission data S2 and parity data P2 of initial transmission data S2 from decoded data of initial transmission data S2. Encoded data and parity data P1 of initial transmission data S1 stored in the transmission data memory 113 are read.

The interleave section 111 applies interleaving based on the propagation quality difference information to data S1, P1, S2, and P2, and segments data into four pieces of data (D1, D2, D3, and D4). After the modulation section 112 modulates data (D1, D2, D3, and D4), data D2 for transmission in the first frame and data D4 for the second frame are stored in the transmission data memory 113 as transmission data after interleaving.

Next, the repeater 100 reads data D2 for transmission in the first frame from the transmission data memory 113 and accumulates data D2 in the buffer 114. Thereafter, data D2 is D/A converted by the D/A conversion section 115, upconverted to a signal in an RF band by the transmission RF section 116, and transmitted from the transmitting antenna. Subsequently, data D4 for transmission in the second frame is read from the transmission data memory 113 and accumulated in the buffer 114. Thereafter, data D4 is D/A converted by the D/A conversion section 115, upconverted to a signal in an RF band by the transmission RF section, and transmitted from the transmitting antenna.

When the difference in propagation quality calculated by the propagation quality difference determination section 107 is smaller than the predetermined value, the switch 110A between the channel encoding section 109 and the modulation section 112 is switched such that data passes through a path not including the interleave section 111. Then, the channel encoding section 109 and the modulation section 112 generate parity bit P2 from S2 decoded data and generated parity bit P2 is stored in the transmission data memory 113.

The repeater 100 reads transmission data S1 from transmission data memory 113 and accumulates transmission data S1 in the buffer 114. Thereafter, transmission data S1 is D/A converted by the D/A conversion section 115, upconverted to a signal in an RF band by the transmission RF section 116, and transmitted from the transmitting antenna. Similarly, the repeater 100 reads transmission data P2 from the transmission data memory 113 and accumulates transmission data P2 in the buffer 114. Thereafter, transmission data P2 is D/A converted by the D/A conversion section 115, upconverted to a signal in an RF band by the transmission RF section 116, and transmitted from the transmitting antenna.

An interleave pattern is determined such that a lot of parity data of a repeater in which poor reception quality of initial transmission data is estimated may be scrambled so as to be transmitted through a link with a good propagation environment (propagation quality), or is determined such that each piece of parity data may be scrambled evenly.

Next, the operation of the base station 300 will be described.

Figure 6:
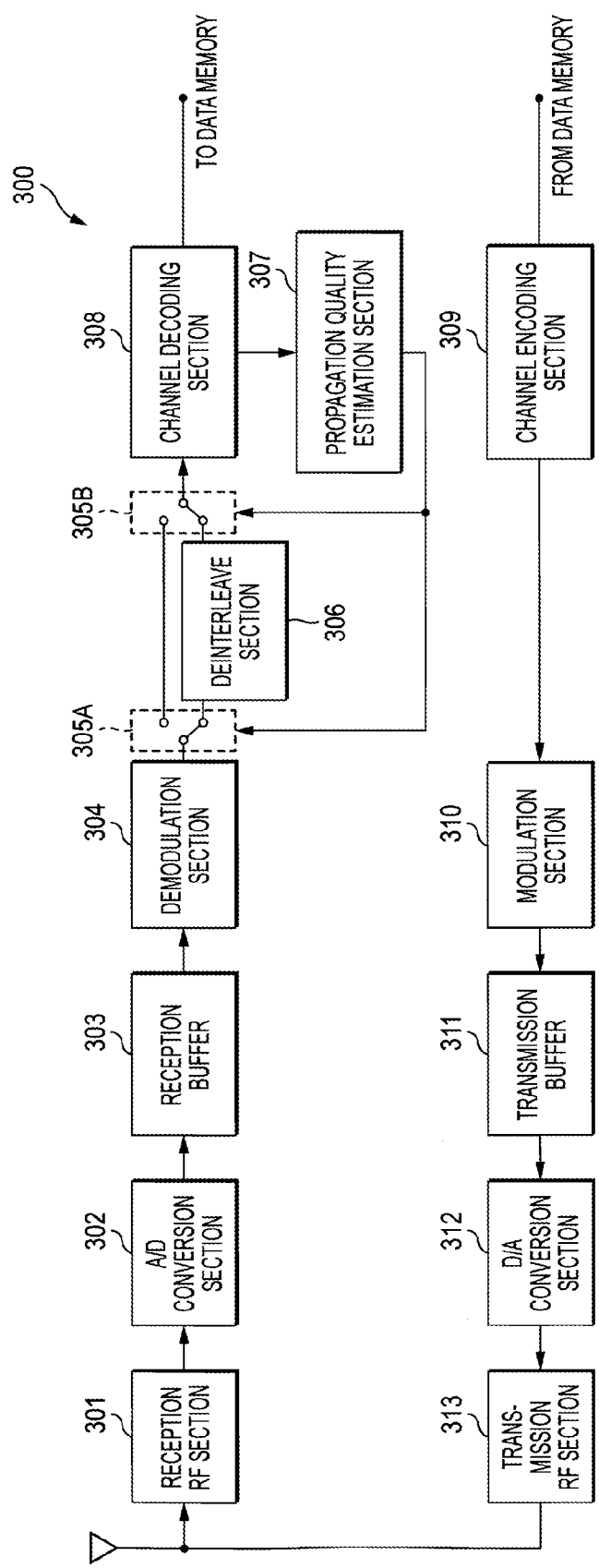
FIG. 6 is a functional block diagram of a base station 300 according to the first embodiment.
Figure 7:
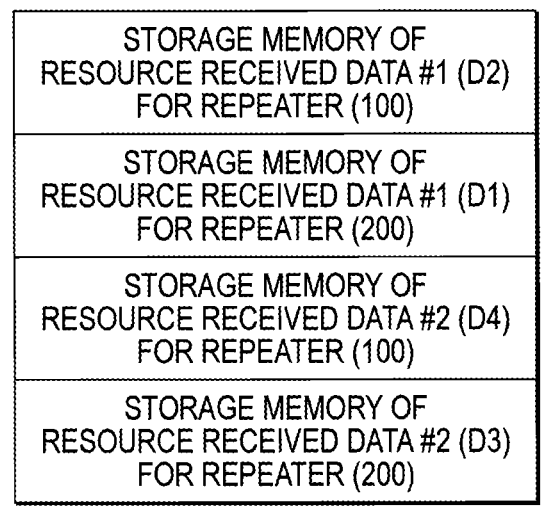
FIG. 7 is a diagram showing the memory interior structure of the base station 300 according to the first embodiment.

FIG. 6 is a functional block diagram of the base station 300. As shown in FIG. 6, the base station 300 includes a reception RF section 301, an A/D conversion section 302, buffers 303 and 311, a demodulation section 304, switches 305A and 305B, a deinterleave section 306, a propagation quality difference determination section 307, a channel decoding section 309, a modulation section 310, a transmission buffer 311, a D/A conversion section 312, and a transmission RF section 313. FIG. 7 is a diagram showing the interior structure of a memory of the base station 300.

Next, an operation until the base station 300 completes reception of one block of data through cooperative relay will be described in detail with reference to FIGS. 2, 3, 6, and 7.

The base station 300 performs upward propagation quality estimation of the repeaters 100 and 200 participating in cooperative relay, and notifies the propagation quality estimation result to the repeaters 100 and 200 participating in cooperative relay together with resource allocation. It is assumed that control information including resource allocation, propagation environment (propagation quality) notification, and the like can be shared by the repeaters 100 and 200 participating in cooperative relay.

Subsequently, the base station 300 receives transmission data D1 and D2 after interleaving transmitted from the repeaters 100 and 200 in the first frame by the reception RF section 301. The signals of transmission data D1 and D2 after interleaving are downconverted to a baseband by the reception RF section 301 and input to the A/D conversion section 302.

Transmission data D1 and D2 after interleaving input to the A/D conversion section 302 are converted to digital signals and retained in the reception buffer 303. As shown in FIG. 7, transmission data D2 after interleaving is stored in "a storage memory of resource received data #1 (D2) for the repeater 100" of the reception buffer 303, and transmission data D1 after interleaving is stored in "a storage memory of resource received data #1 (D1) for the repeater 200".

Subsequently, the base station 300 receives transmission data D3 and D4 after interleaving transmitted from the repeaters 100 and 200 in the second frame by the reception RF section 301. Transmission data D3 and D4 after interleaving received by the reception RF section 301 are downconverted to a baseband by the reception RF section 301, and the signals are input to the A/D conversion section 302. Transmission data D3 and D4 after interleaving input to the A/D conversion section 302 are converted to digital signals and retained in the reception buffer 303. As shown in FIG. 7, transmission data D4 after interleaving is stored in "a storage memory of resource received data #2 (D4) for the repeater 100" of the reception buffer 303, and transmission data D3 after interleaving is stored in "a storage memory of resource received data #2 (D3) for the repeater 200" of the reception buffer 303.

If transmission data D1, D2, D3, and D4 are accumulated in all the memories of the reception buffer, demodulation processing is performed for transmission data D1, D2, D3, and D4 after interleaving.

Next, on the basis of the determination result of the propagation quality determination section 307, when the difference in propagation quality between each of the repeaters 100 and 200 and the base station (eNB) 300 is equal to or greater than the predetermined value, transmission data D1, D2, D3, and D4 after demodulation processing are collectively deinterleaved by the deinterleave section 306 to obtain initial transmission data S1 and S2 and parity data P1 and P2 of the repeaters 100 and 200. Subsequently, data S1 and P1 for the repeater 100 and data S2 and P2 for the repeater 200 are channel-decoded by the channel decoding section 308 to obtain desired data.

When the difference in propagation quality between each of the repeaters 100 and 200 and the base station (eNB) is smaller than the predetermined value, after demodulation of transmission data D1, D2, D3, and D4, data S1 and P1 for the repeater 100 and data S2 and P2 for the repeater 200 are channel-decoded by the channel decoding section 309 to obtain desired data.

As described above, according to the first embodiment, it is possible to improve decoding performance of repeater data at the base station (eNB) while achieving sharing of "data exchange between the repeaters 100 and 200" and "transmission of initial transmission data to the base station (eNB)".

According to the first embodiment, even when the propagation environment (propagation quality) between the base station (eNB) and one of the repeaters is poor, data is randomized, such that repeater data is not deviated at the base station (eNB), improving reception quality at the base station (eNB).

In addition to control information including the determination of propagation quality being included in grant information from the base station (eNB), when propagation quality is equal to or greater than a predetermined value, NACK from the base station (eNB) may be set to be soft NACK, and propagation quality information may be included in NACK. Initial transmission data is not limited to a systematic bit and may be self-decodable data.

Although in the first embodiment, data is interleaved to randomize data, other means may be used insofar as the means can randomize data. For example, interleaving with respect to the time axis, hopping with respect to the frequency axis, or scrambling may be used.

(Second Embodiment)

Figure 8:
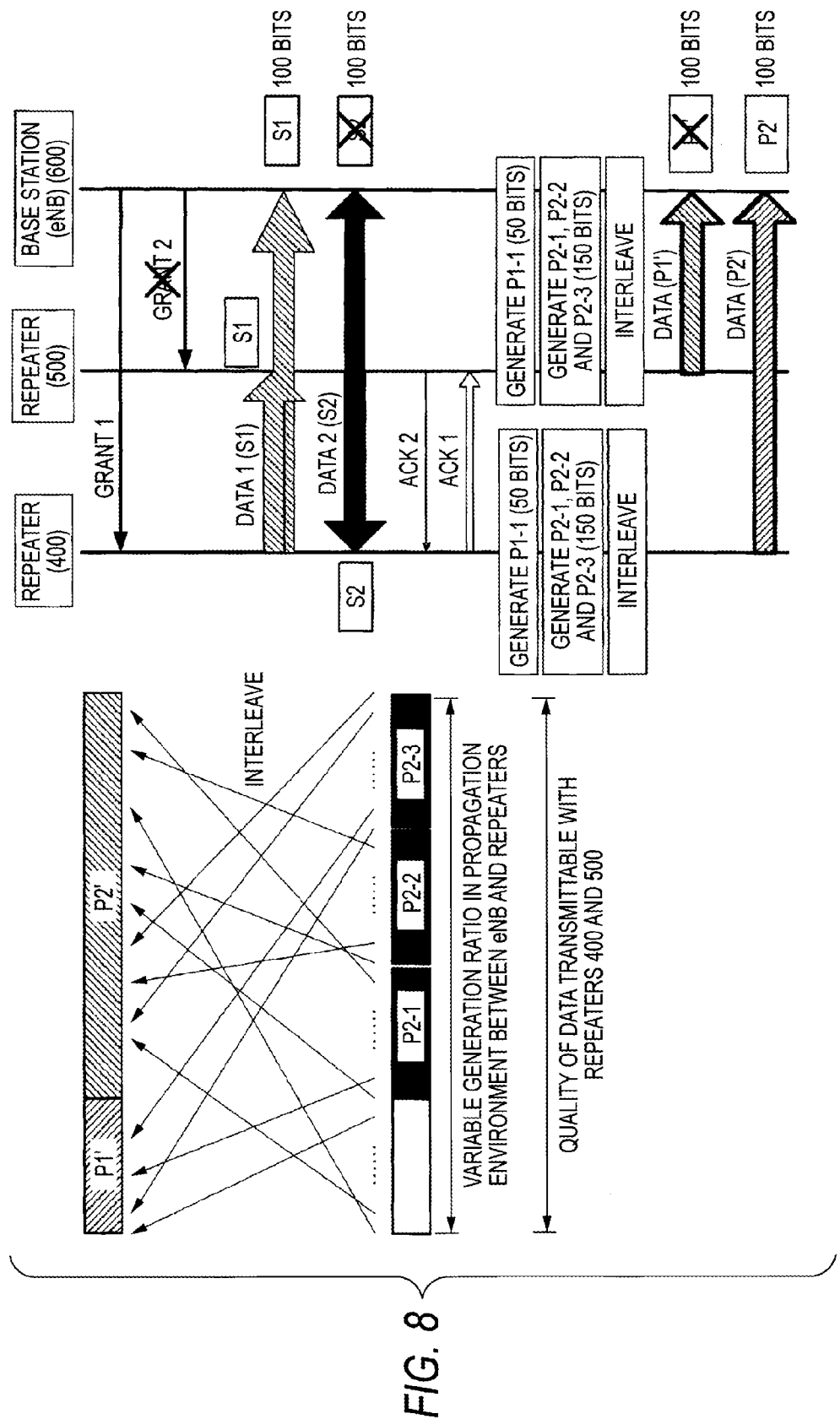
FIG. 8 is a sequence diagram of cooperative relay according to a second embodiment.
Figure 9:
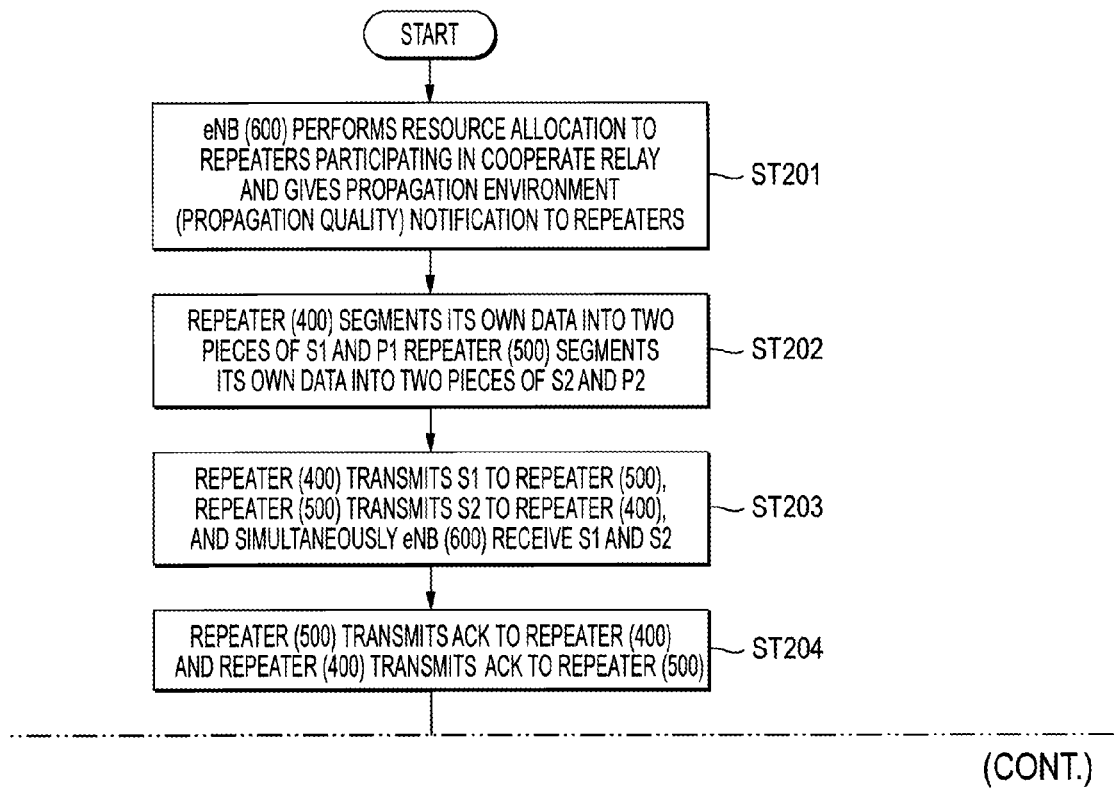
FIG. 9 is a diagram showing the processing flow of cooperative relay according to the second embodiment.

In a second embodiment, similarly to the first embodiment, cooperative relay is performed to relay initial transmission data from each of repeaters 400 and 500 to a base station (eNB) 600. Although in a cooperative relay system of the second embodiment, it is assumed that the propagation environment (propagation quality) between the base station (eNB) 600 and the repeater 500 is poor, the invention is not limited thereto. Similarly to the first embodiment, in the second embodiment, it should suffice that there is a difference in the propagation environment (propagation quality) between the base station (eNB) and each of the repeaters. FIG. 8 is a sequence diagram in the second embodiment. FIG. 9 is a diagram of the processing flow in the second embodiment.

An operation relay of cooperative relay in the second embodiment will be described with reference to FIG. 8.

Procedure 1: The base station (eNB) 600 performs resource allocation and gives propagation environment (propagation quality) notification to the repeaters 400 and 500 participating in cooperative relay. The control information can be shared by the repeaters 400 and 500 participating in cooperative relay.

Procedure 2: Each of the repeaters 400 and 500 segments data of the local station for cooperative relay into two pieces of data. In the second embodiment, similarly to the first embodiment, out of data of the local station for cooperative relay, initial transmission data including a systematic bit is represented by Sx, and transmission data including a parity bit is represented by Px (where x corresponds to a repeater number).

Procedure 3: The repeater 400 transmits initial transmission data S1 of the local station to the repeater 500, and the repeater 500 receives initial transmission data S1 of the other station.

Procedure 4: The base station (eNB) 600 also receives initial transmission data S1 transmitted to the repeater 500.

Procedure 5: Meanwhile, the repeater 500 transmits initial transmission data S2 of the local station to the repeater 400, and the repeater 400 receives initial transmission data S2 of the other station.

Procedure 6: The base station (eNB) 600 also receives initial transmission data S2 transmitted to the repeater 400.

Procedure 7: The repeater 500 transmits an ACK signal to the repeater 400.

Procedure 8: The repeater 400 transmits an ACK signal to the repeater 500.

Procedure 9: When the difference in propagation environment (propagation quality) between the base station (eNB) and each of the repeaters is equal to or greater than a predetermined value, the repeater 500 generates parity data P1-1, P1-2, . . . having reflected the propagation environment (propagation quality) of each of the repeaters 400 and 500 obtained in Procedure 1 from received initial transmission data S1 of the other station. For example, it is possible to generate parity data while reflecting the propagation environment (propagation quality) of each of the repeaters on the basis of the standards of the quantity and type of data and the like. The repeater 500 generates parity data P2-1, P2-2, . . . having reflected the propagation environment (propagation quality) from initial transmission data S2 of the local station in the same manner.

Procedure 10: The repeater 500 applies interleaving to all pieces of generated parity data P1-1, P1-2, . . . , P2-1, P2-2, . . . and segments data into two pieces of data to generate parity data P1' and P2' after interleaving.

Procedure 11: The repeater 400 generates parity data P2-1, P2-2, . . . having reflected the propagation environment (propagation quality) of each of the repeaters obtained in Procedure 1 from received initial transmission data S2 of the other station. For example, it is possible to generate parity data while reflecting the propagation environment (propagation quality) of each of the repeaters on the basis of the quantity and type of data and the like. Similarly, the repeater 400 generates parity data P1-1, P1-2, . . . having reflected the propagation environment (propagation quality) from initial transmission data S1 of the local station in the same manner.

Procedure 12: The repeater 400 applies interleaving to all pieces of generated parity data P1-1, P1-2, . . . , P2-1, P2-2, . . . and segments data into two pieces of data to generate parity data P1' and P2' after interleaving.

Procedure 13: The repeater 500 transmits generated P1' to the base station (eNB) 600.

Procedure 14: The repeater 400 transmits generated P2' to the base station (eNB) 600.

Procedure 15: The base station (eNB) 600 decodes received data.

An interleave pattern is determined such that a lot of parity data of a repeater in which poor reception quality of initial transmission data is estimated may be scrambled so as to be transmitted through a path with a good propagation environment (propagation quality), or is determined such that each piece of parity data may be scrambled evenly.

A case will be described where the difference in the propagation environment (propagation quality) between the base station (eNB) 600 and each of the repeaters 400 and 500 is smaller than the predetermined value.

Procedure #9: In Procedure 9, when the difference in the propagation environment (propagation quality) between the base station (eNB) 600 and each of the repeaters 400 and 500 is smaller than the predetermined value, the repeater 500 generates parity data P1 from received initial transmission data S1 of the other station.

Procedure #10: The repeater 400 generates parity data P2 from received initial transmission data S2 of the other station.

Procedure #11: The repeater 500 transmits generated P1 to the base station (eNB) 600.

Procedure #12: The repeater 400 transmits generated P2 to the base station (eNB) 600.

Procedure #13: The base station (eNB) 600 decodes received data.

Next, processing for cooperative relay of the repeaters 400 and 500 and the base station (eNB) 600 in the second embodiment will be described with reference to FIG. 9. Similarly to FIG. 8, out of data of the local station for cooperative relay, initial transmission data including a systematic bit is represented by Sx, and transmission data including a parity bit is represented by Px (where x corresponds to a repeater number).

First, the base station (eNB) 600 performs resource allocation and gives propagation environment (propagation quality) notification to the repeaters 400 and 500 participating in cooperative relay (Step S201). The control information including resource allocation, propagation environment (propagation quality) notification, and the like can be shared by the repeaters 400 and 500 participating in cooperative relay.

Next, the repeaters 400 and 500 respectively segment data S1 and S2 of the local station for cooperative relay into two pieces of data (Step S202).

Next, while the repeater 400 transmits initial transmission data S1 of the local station to the repeater 500, the repeater 500 transmits initial transmission data S2 of the local station to the repeater 400. Simultaneously, the base station (eNB) 600 receives initial transmission data S1 and S2 of the local station from the repeaters 400 and 500 (Step S203). Next, each of the repeaters 400 and 500 transmits the ACK/NACK signal indicating whether or not the local station receives initial transmission data of the local station (Step S204).

It is determined whether the difference in the propagation environment (propagation quality) between each of the repeaters and the base station is equal to or greater than a predetermined value or not from propagation quality information between each of the repeaters 400 and 500 and the base station 600 (Step S205).

When the difference in the propagation environment (propagation quality) between each of the repeaters and the base station is equal to or greater than the predetermined value, relay data processing is performed for compensating for data of at least a portion of data to be transmitted from one repeater to the base station and data to be transmitted from the other repeater to the base station for cooperative relay in accordance with the difference in propagation quality between the base station and each of the wireless communication apparatuses. Specifically, the repeater 500 generates parity data P1-1, P1-2, . . . having reflected the difference in the propagation environment (propagation quality) from received initial transmission data S1 of the other station (Step ST206), and similarly generates parity data P2-1, P2-2, . . . having reflected the difference in the propagation environment (propagation quality) from initial transmission data S2 of the local station (Step ST207). Then, the repeater 500 interleaves all pieces of parity data P1-1, P1-2, . . . , P2-1, P2-2, . . . and segments data into two pieces of data as parity data P1' and P2' after interleaving (Step ST208).

Meanwhile, the repeater 400 generates parity data P2-1, P2-2, . . . having reflected the difference in the propagation environment (propagation quality) from received initial transmission data S2 of the other station (Step 209), and generates parity data P1-1, P1-2, . . . having reflected the difference in the propagation environment (propagation quality) from initial transmission data S1 of the local station (Step 210).

The repeater 400 interleaves all pieces of parity data P1-1, P1-2, . . . , P2-1, P2-2, . . . and segments data into two pieces of data as parity data P1' and P2' after interleaving (Step 211).

Next, the repeater 500 transmits parity data P1' out of generated parity data P1' and P2' after interleaving to the base station 600. Meanwhile, the repeater 400 transmits parity data P2' out of generated parity data P1' and P2' after interleaving to the base station 600.

When the difference in the propagation environment (propagation quality) between each of the repeaters and the base station is smaller than the predetermined value, the repeater 500 generates parity data P1 from received initial transmission data S1 of the other station and transmits generated parity data P1 to the base station 600 (Steps S214 and S216). Meanwhile, the repeater 400 generates parity data P2 from received initial transmission data S2 of the other station and transmits generated parity data P2 to the base station 600 (Steps S215 and S217).

Transmission data generated by the repeaters 400 and 500 is transmitted to the base station (eNB) 600 and decoded (Step S218).

As described above, according to the second embodiment, it is possible to improve decoding performance of repeater data while achieving sharing of processing for "data exchange between the repeaters" and "initial data transmission to the base station (eNB)".

Although in the second embodiment, data is interleaved to randomize data, other means may be used insofar as the means can randomize data. For example, interleaving with respect to the time axis, hopping with respect to the frequency axis, or scrambling may be used.

Figure 10:
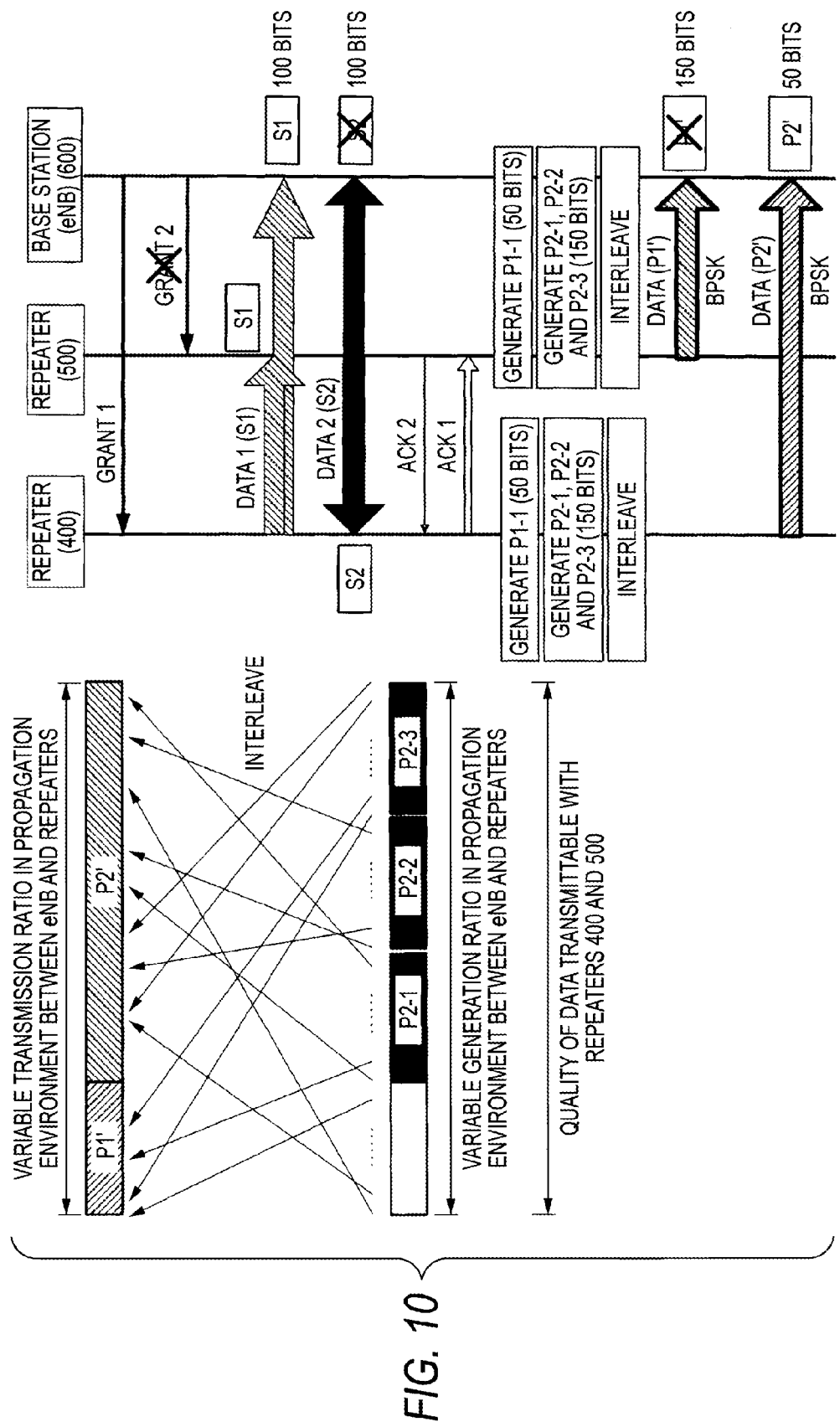
FIG. 10 is a sequence diagram of cooperative relay in controlling the quantity of parity data to be generated according to the second embodiment.

In the second embodiment, each repeater may transmit parity data to be generated while controlling the quantity of parity data in accordance with the propagation environment (propagation quality) to be notified from the base station (eNB) 600. FIG. 10 is a sequence diagram when the quantity of parity data to be generated by a repeater is controlled in accordance with the propagation environment (propagation quality). As shown in FIG. 10, when the quantity of data transmittable with the repeaters 400 and 500 is 200 bits, the repeater 400 generates P1-1 with the parity data quantity of 50 bits, and the repeater 500 generates P2-1 (parity data quantity of 50 bits), P2-2 (parity data quantity of 50 bits), and P2-3 (parity data quantity of 50 bits) with the parity data quantity of 150 bits. The repeaters interleave all pieces of parity data P1-1, P2-1, P2-2, P2-3 to generate two pieces of segmented data P1' and P2'. With regard to the parity data quantity, P1' is 50 bits and P2' is 150 bits in accordance with the propagation environment (propagation quality) notified from the base station (eNB) 600. Next, parity data P2'(parity data quantity of 150 bits) is transmitted from the repeater 400 to the base station (eNB) 600, and parity data P1' (parity data quantity of 50 bits) is transmitted from the repeater 500.

Figure 11:
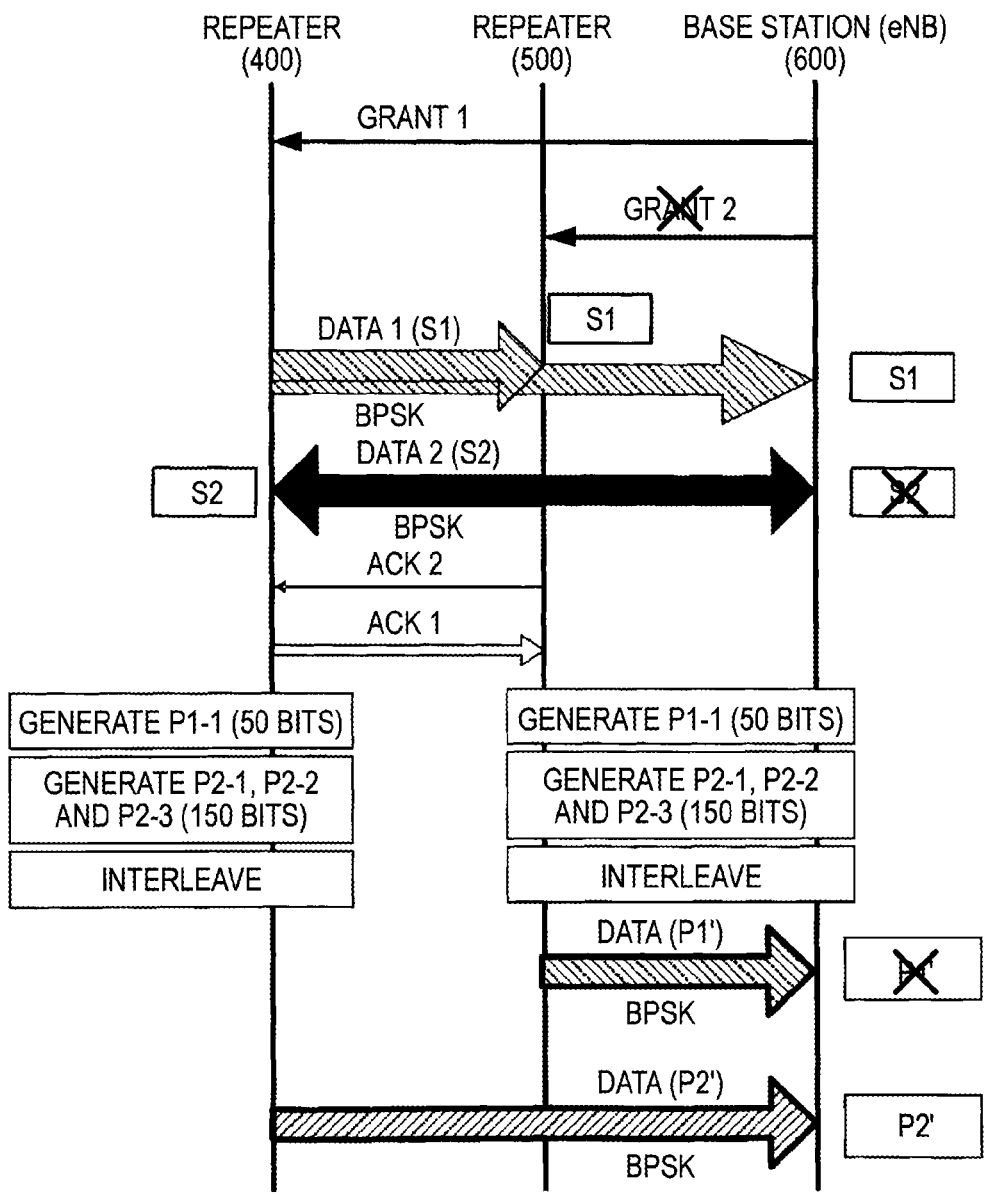
FIG. 11 is a sequence diagram of cooperative relay in controlling the quantity of initial transmission data to be transmitted in FIG. 10.

In a transmitting method shown in FIG. 10, the repeaters 400 and 500 may transmit initial transmission data while controlling the quantity of initial transmission data subjected to data exchange in accordance with the propagation environment (propagation quality) to be notified from the base station (eNB) 600. For example, as shown in FIG. 11, it is assumed that the quantity of initial transmission data S1 of the repeater 400 to be transmitted from the repeater 400 to the base station is 150 bits, and the quantity of initial transmission data S2 of the repeater 500 is 50 bits.

In the second embodiment, it is possible to combine with the first embodiment in which there is no sharing of processing for "data exchange between the repeaters" and "initial data transmission to the base station (eNB) 600".

Next, the operation of the repeater 400 will be described.

Figure 12:
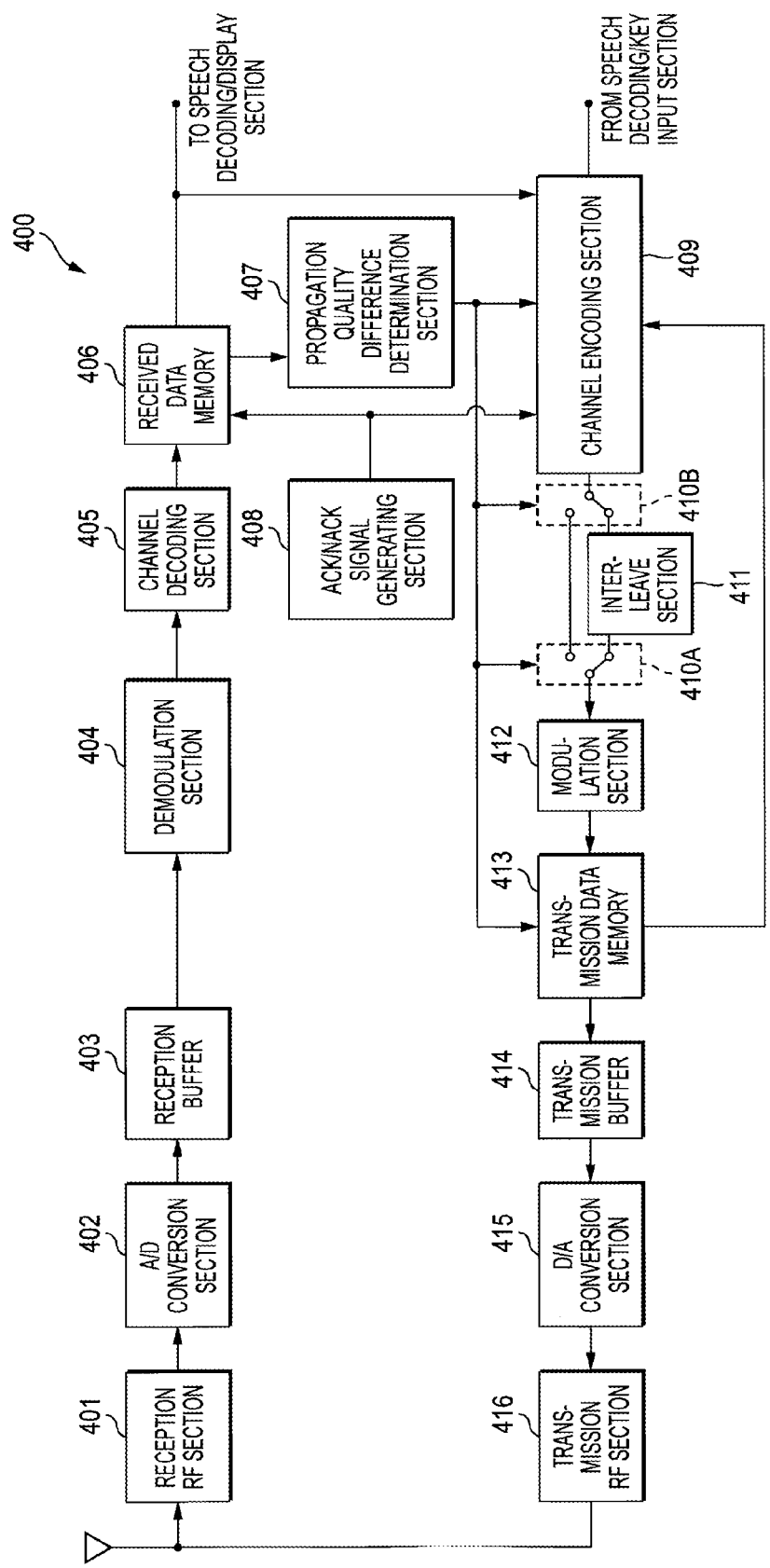
FIG. 12 is a functional block diagram of a repeater 400 according to the second embodiment.

FIG. 12 is a functional block diagram of the repeater 100 according to the first embodiment.

The repeater 400 includes a reception RF section 401, an ND conversion section 402, buffers 403 and 414, a demodulation section 404, a channel decoding section 405, a received data memory 406, a propagation quality difference determination section 407, an ACK/NACK signal generating section 408, a channel encoding section 409, switches 410A and 410B, an interleave section 411, a modulation section 412, a transmission data memory 413, a D/A conversion section 415, and a transmission RF section 416.

An operation until the repeater 400 completes transmission of one block of data through cooperative relay will be described in detail with reference to FIGS. 8, 9, 12, and 13.

Figure 13:
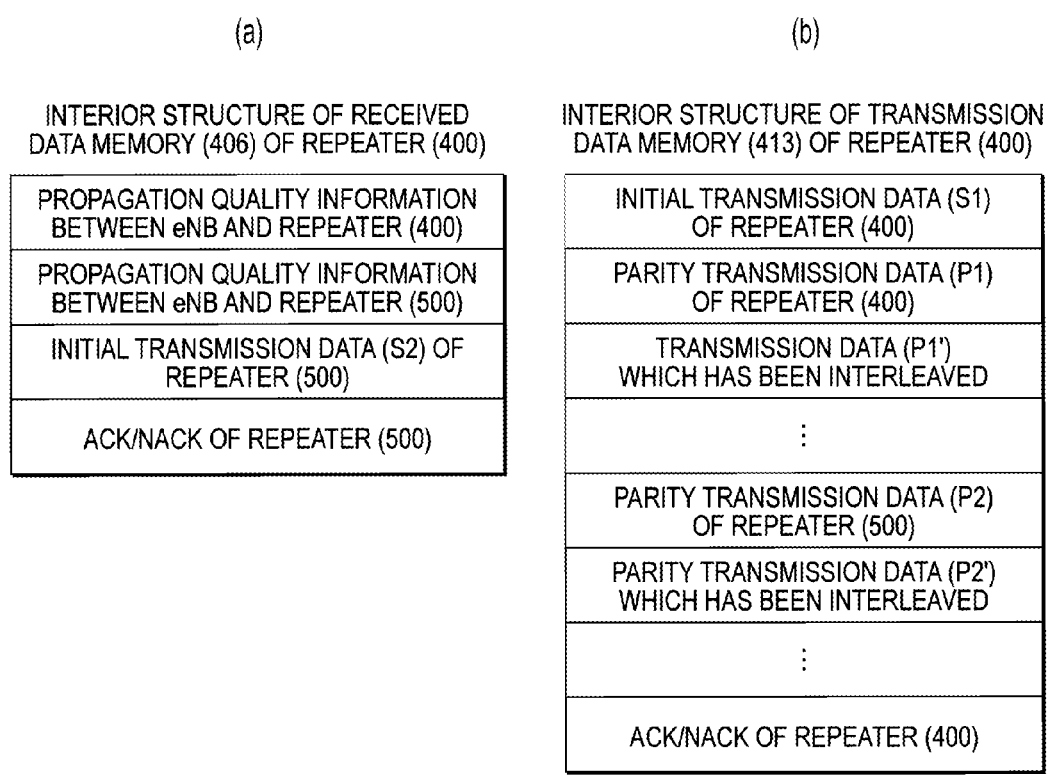
FIG. 13 shows the memory interior structure of the repeater 400 according to the second embodiment, specifically.

FIG. 13 shows the interior structure of a memory of the repeater 400. FIG. 13(*a*) is a diagram showing the interior structure of the received data memory 406, and FIG. 13(*b*) is a diagram showing the interior structure of the transmission data memory 413.

The repeater 400 receives "propagation quality information from the base station (eNB) 600 toward the repeater 400" and "propagation quality information from the base station (eNB) 600 toward the repeater 500" from the base station (eNB) 600 by the reception RF section 401.

The signal of propagation quality information received from the base station (eNB) 600 is downconverted to a baseband by the reception RF section 401, and the signal is input to the A/D conversion section 402.

The signal of propagation quality information input to the A/D conversion section 402 is converted to a digital signal and accumulated in the buffer 403. The signal including propagation quality information is demodulated by the demodulation section 404, channel-decoded by the channel decoding section 405, and stored in the received data memory 406, as shown in FIG. 13(*a*).

The repeater 400 segments data of the local station for cooperative relay into initial transmission data S1 including a systematic bit and parity transmission data P1 including a parity bit and stores initial transmission data S1 and parity transmission data P1 in the transmission data memory 413, as shown in FIG. 13(*b*).

The repeater 400 reads initial transmission data S1 of the local station from the transmission data memory 413 and accumulates initial transmission data S1 in the buffer 414. Thereafter, initial transmission data S1 is D/A converted by the D/A conversion section, upconverted to a signal in an RF band by the transmission RF section, and transmitted from the transmitting antenna to the base station (eNB) 600.

Subsequently, the repeater 400 receives initial transmission data S2 of the other station by the reception RF section 401. The signal of received initial transmission data S2 of the other station is downconverted to a baseband by the reception RF section 401, and the signal is input to the A/D conversion section 402. The signal input to the A/D conversion section 402 is converted to a digital signal and accumulated in the buffer 403. The signal of initial transmission data S2 of the other station is subjected to processing for demodulation by the demodulation section 404 and channel decoding by the channel decoding section 405, and is then stored in the received data memory 406, as shown in FIG. 13(*a*).

The repeater 400 generates an ACK/NACK signal in accordance with the channel decoding result (CRC and the like) of initial transmission data S2 of the other station by the ACK/NACK signal generating section 408. If reception is successful, the ACK signal is generated, and if reception fails, the NACK signal is generated. The ACK signal or the NACK signal of the repeater 400 generated by the ACK/NACK signal generating section 408 is subjected to processing for channel encoding by the channel encoding section 409 and modulation by the modulation section 412. Thereafter, as shown in FIG. 13(*b*), the ACK signal or the NACK signal is stored in the transmission data memory 413. The ACK/NACK signal of the repeater 400 is read from the transmission data memory 413 and accumulated in the buffer 414. Thereafter, the ACK/NACK signal is A/D converted by the D/A conversion section 415, upconverted to a signal in an RF band by the transmission RF section 416, and transmitted from the transmitting antenna.

Subsequently, the repeater 400 receives the ACK/NACK signal from the repeater 500 by the reception RF section 401. The received ACK/NACK signal is downconverted to a baseband by the reception RF section 401 and input to the A/D conversion section 402. The signal input to the A/D conversion section is converted to a digital signal and accumulated in the buffer 403. Then, the ACK/NACK signal from the repeater 500 is subjected to processing for demodulation by the demodulation section 404 and channel decoding by the channel decoding section 405 and then stored in the received data memory 406, as shown in FIG. 13(a).

The ACK/NACK signal of the repeater 400 is read from the transmission data memory 413 and accumulated in the buffer 414. Thereafter, the ACK/NACK signal is D/A converted by the D/A conversion section 415, upconverted to a signal in an RF band by the transmission RF section 416, and transmitted from the transmitting antenna.

Subsequently, propagation quality information between the base station (eNB) 600 and the repeater 400 and propagation quality information between the base station (eNB) 600 and the repeater 500 stored in the received data memory 406 are read. The propagation quality difference determination section 407 calculates the difference in propagation quality between the base station (eNB) 600 and each of the repeaters and determines whether or not the difference is equal to or greater than a predetermined value.

When the difference in propagation quality between the base station (eNB) 600 and each of the repeaters is equal to or greater than the predetermined value, the switches 410A and 410B between the channel encoding section 409 and the modulation section 412 are controlled to be switched to the interleave section 411. Meanwhile, when the difference in propagation quality between the base station (eNB) 600 and each of the repeaters is smaller than the predetermined value, the switches 410A and 410B between the channel encoding section 409 and the modulation section 412 are switched such that data passes through a path not including the interleave section 411. The calculated propagation quality difference information is also output to the channel encoding section 109.

Subsequently, decoded data of initial transmission data S2 of the other station stored in the received data memory 406 is read, and when the difference in propagation quality is equal to or greater than the predetermined value, the channel encoding section 409 generates parity data P2-1, P2-2, ... from decoded data of initial transmission data S2 of the other station in accordance with the difference in propagation quality.

Decoded data of initial transmission data S1 of the local station stored in the transmission data memory 413 is read, and the channel encoding section 409 generates parity data P1-1, P1-2, ... from decoded data of initial transmission data S1 of the local station in accordance with the propagation quality difference information.

Interleaving based on the propagation quality difference information is applied to all pieces of generated parity data P1-1, P1-2, ..., P2-1, P2-2, ... to segment data into two pieces of data as parity data P1' and P2' after interleaving. Parity data P1' and P2' after interleaving are modulated by the modulation section 412 and are stored in the transmission data memory 413. When the difference in propagation quality is equal to or greater than the predetermined value, the repeater 400 reads parity data P1' after interleaving from the transmission data memory 413 and accumulated parity data P1' in the buffer 414. Thereafter, parity data P1' is D/A converted by the D/A conversion section 415, upconverted to a signal in an RF band by the transmission RF section 416, and transmitted from the transmitting antenna.

Meanwhile, when the difference in propagation quality is smaller than the predetermined value, the channel encoding section 409 and the modulation section 412 generate a parity bit P2 from decoded data of initial transmission data S2 of the other station and store the parity bit P2 in the transmission data memory 413. The repeater 400 reads initial transmission data P2 of the other station from the transmission data memory 413 and accumulates initial transmission data P2 in the buffer 414. Thereafter, initial transmission data P2 is D/A converted by the D/A conversion section 415, upconverted to a signal in an RF band by the transmission RF section 416, and transmitted from the transmitting antenna.

An interleave pattern is determined such that a lot of parity data of a repeater in which poor reception quality of initial transmission data is estimated may be scrambled so as to be transmitted through a path with a good propagation environment (propagation quality), or is determined such that each piece of parity data may be scrambled evenly.

Next, the operation of the base station 600 will be described.

Figure 14:
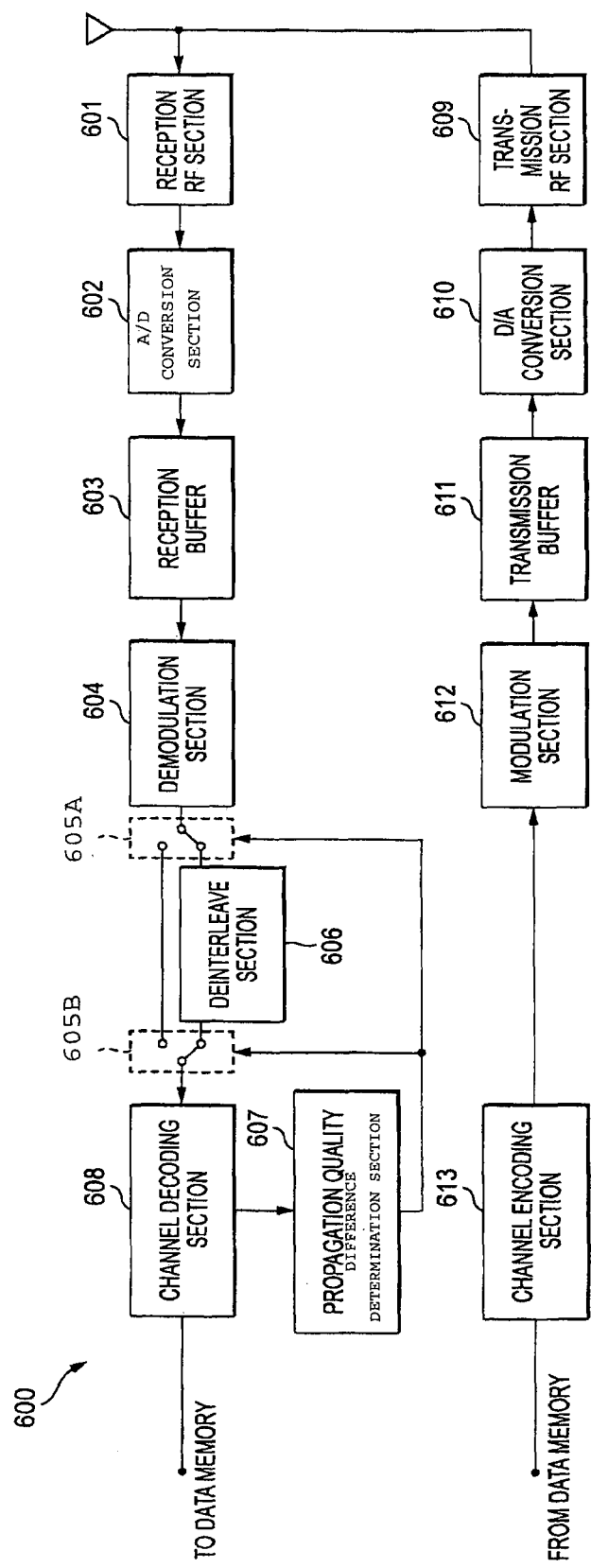
FIG. 14 is a functional block diagram of a base station 600 according to the second embodiment.
Figure 15:
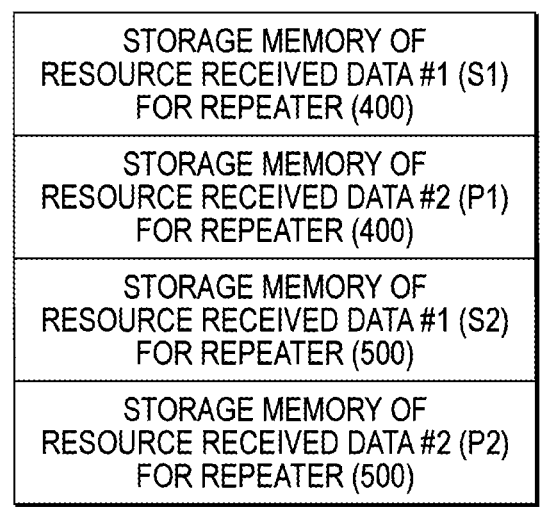
FIG. 15 is a diagram showing the buffer interior structure of the base station 600 according to the second embodiment.

FIG. 14 is a functional block diagram of the base station 600. As shown in FIG. 14, the base station 600 includes a reception RF section 601, an A/D conversion section 602, a reception buffer 603, a transmission buffer 611, a demodulation section 604, switches 605A and 605B, a deinterleave section 606, a propagation quality difference determination section 607, a channel decoding section 608, a transmission RF section 609, a D/A conversion section 610, a transmission buffer 611, and a modulation section 612. FIG. 15 is a diagram showing the interior structure of a buffer of the base station 600.

An operation until the base station 600 completes reception of one block of data through cooperative relay will be described in detail.

The base station 600 performs upward propagation quality estimation of the repeaters 400 and 500 participating in cooperative relay by the propagation quality difference determination section 607, and notifies the propagation quality estimation results to the repeaters 400 and 500 participating in cooperative relay together with resource allocation.

Subsequently, the base station 600 receives initial transmission data S1 and S2 at the time of data exchange between the repeaters 400 and 500 participating in cooperative relay by the reception RF section 601. The received signals are downconverted to a baseband by the reception RF section 601, and the signals are input to the A/D conversion section 602. The signals of initial transmission data S1 and S2 input to the A/D conversion section 602 are converted to digital signals and stored in the reception buffer 603, as shown in FIG. 15.

The base station 600 receives transmission data (P1 and P2 or P1' and P2') transmitted from the repeaters 400 and 500 participating in cooperative relay by the reception RF section 601. Received data (P1 and P2 or P1' and P2') is down converted to a baseband by the reception RF section 601, and the signal is input to the A/D conversion section 602. The signal input to the ND conversion section 602 is converted to a digital signal and stored in the reception buffer 603, as shown in FIG. 15. If a desired quantity of data (data received twice from a resource for the repeater 400 and data received twice from a resource for the repeater 500) is accumulated in the reception buffer 603, S1, P1, S2, and P2 are individually demodulated.

On the basis of the estimation result by the propagation quality difference determination section 607, when the difference in propagation quality is equal to or greater than the predetermined value, received data S1, P1, S2, and P2 are demodulated, and then the deinterleave section 606 applies deinterleaving to P1 and P2 to obtain parity data P1-1, P1-2, . . . , P2-1, P2-2, . . . . Subsequently, initial transmission data S1 and parity data P1-1, P1-2, . . . for the repeater 400 and initial transmission data S2 and parity data P2-1, P2-2, . . . for the repeater 500 are subjected to channel decoding processing by the channel decoding section 608, obtaining desired data.

Meanwhile, on the basis of the estimation result by the propagation quality difference determination section 607, when the difference in propagation quality is smaller than the predetermined value, received data S1, P1, S2, and P2 are demodulated, and then initial transmission data S1 and parity data P1 for the repeater 400 and initial transmission data S2 and parity data P2 for the repeater 500 are subjected to channel decoding processing by the channel decoding section 608, obtaining desired data.

In the second embodiment, it is possible to improve decoding performance of repeater data at the base station (eNB) 600 while achieving sharing of "data exchange between the repeaters" and initial data transmission to the base station (eNB) 600".

According to the second embodiment, even when the propagation environment (propagation quality) between the base station (eNB) and one of the repeaters is poor, data is randomized, such that repeater data is not deviated at the base station (eNB), improving reception quality at the base station (eNB).

In addition to control information including the determination of propagation quality being included in grant information from the base station (eNB), when propagation quality is equal to or greater than a predetermined value, NACK from the base station (eNB) may be set to be soft NACK, and propagation quality information may be included in NACK. The initial transmission data is not limited to a systematic bit, and may be self-decodable data.

(Third Embodiment)

Figure 16:
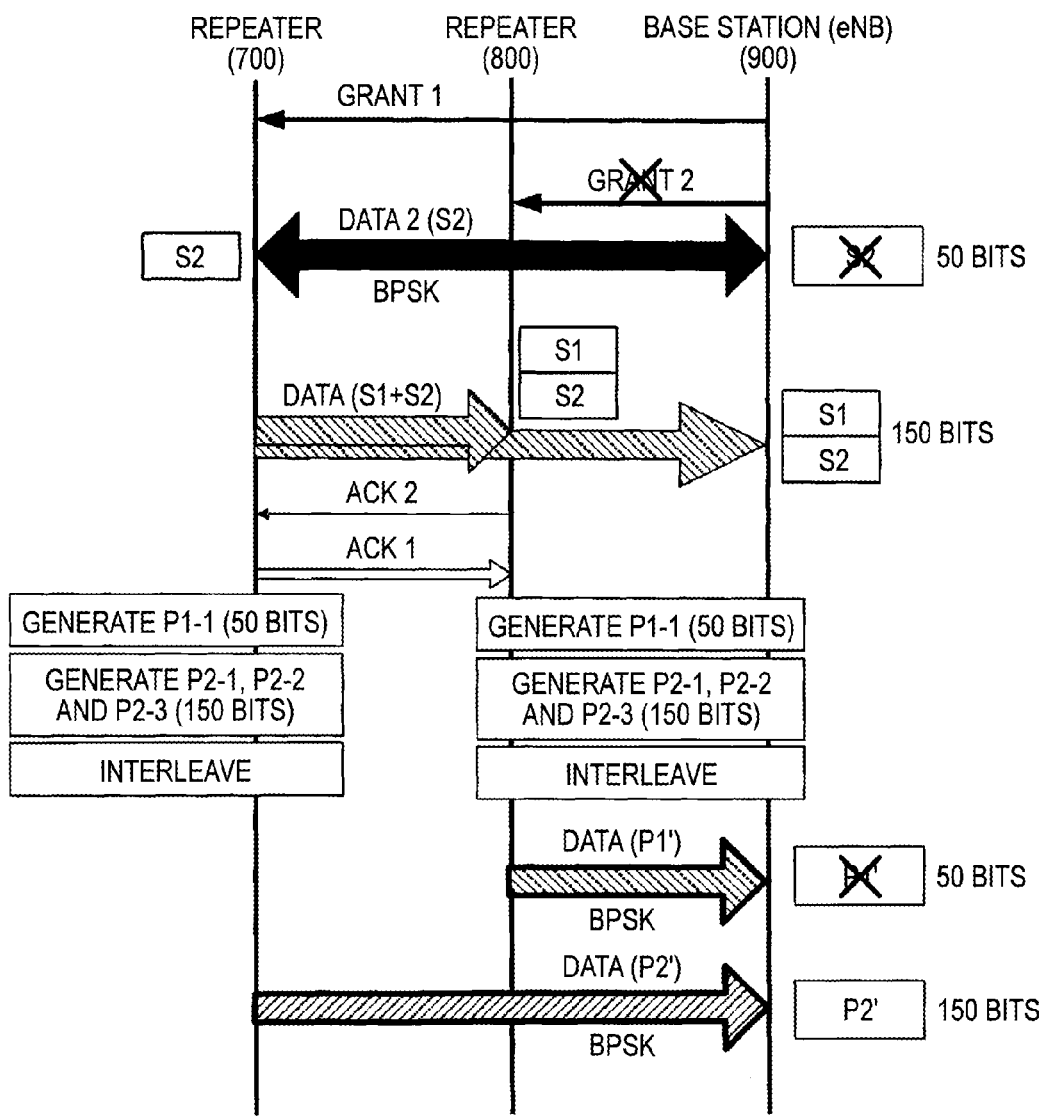
FIG. 16 is a sequence diagram of cooperative relay according to a third embodiment.
Figure 17:
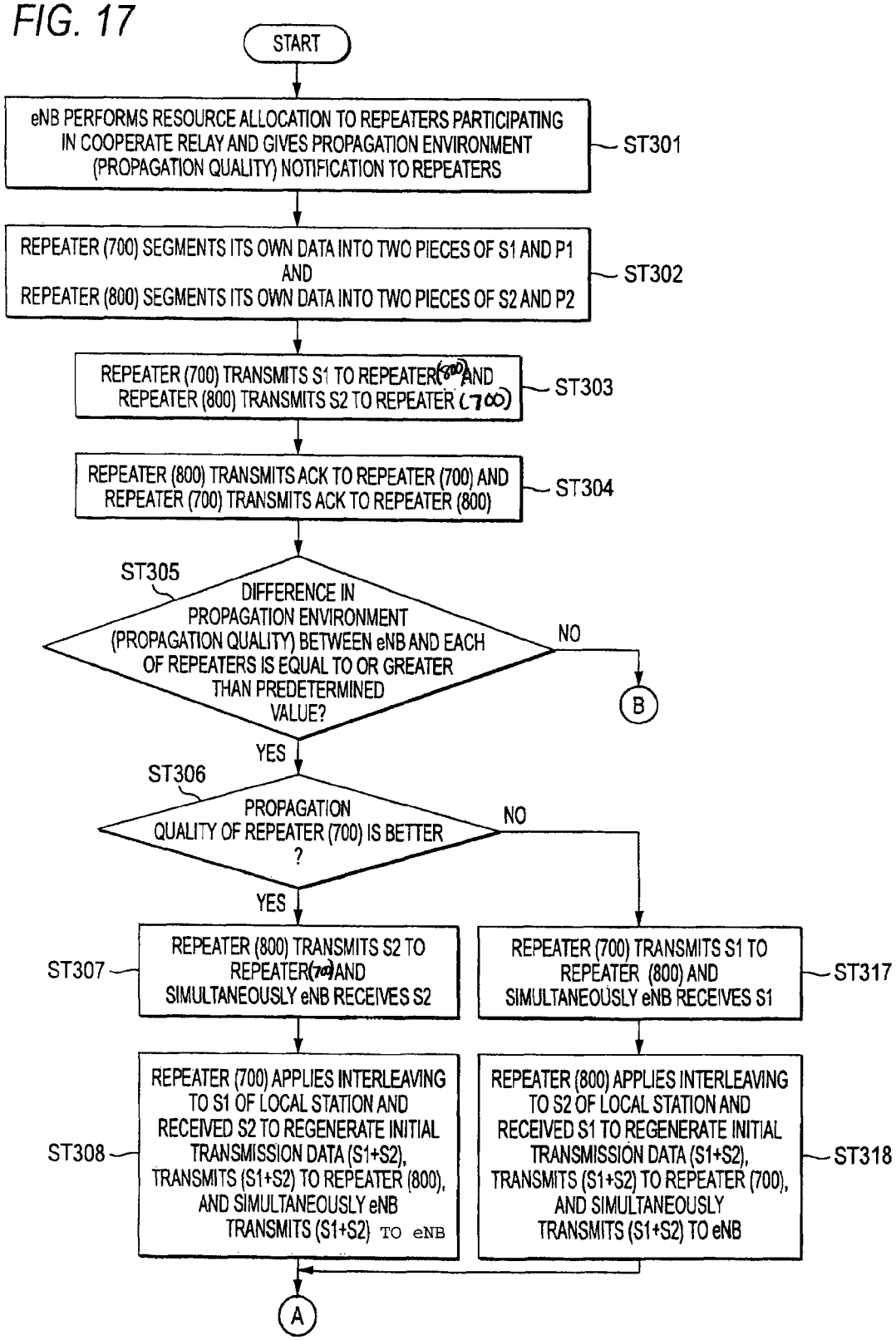
FIG. 17 is a diagram showing the processing flow of cooperative relay according to the third embodiment.

In a third embodiment, similarly to the first embodiment, cooperative relay is performed to relay initial transmission data from repeaters 700 and 800 to a base station (eNB) 900. FIG. 15 is a sequence diagram in the third embodiment. FIGS. 16 and 17 are diagrams showing the processing flow in the third embodiment.

An operation example of each of the repeaters and the base station (eNB) at the time of cooperative relay in the third embodiment will be described with reference to FIG. 15. FIG. 15 shows an operation example of each of the repeaters and the base station (eNB) at the time of cooperative relay when the propagation environment (propagation quality) between the base station (eNB) 900 and the repeater 800 is inferior to the propagation environment (propagation quality) between the base station (eNB) 900 and the repeater 700. However, in the third embodiment, similarly to the first and second embodiments, it should suffice that there is a difference in the propagation environment (propagation quality) between the base station (eNB) and each of the repeaters.

Procedure 1: The base station (eNB) 900 performs resource allocation and gives propagation environment (propagation quality) notification to the repeaters 700 and 800 participating in cooperative relay. The control information can be shared by the repeaters participating in cooperative relay.

Procedure 2: Since the propagation environment (propagation quality) of the other station (repeater 800) is inferior to that of the local station, the repeater 700 determines that the number of data exchange is ahead of the other station, and determines the data quantity, the modulation scheme, the interleave pattern, and the like from the differences in the propagation environment (propagation quality) of the local station and the other station (repeater 800).

Procedure 3: Since the propagation environment (propagation quality) of the other station (repeater 700) is superior to that of the local station, the repeater 800 determines that the number of data exchange is ahead of the local station, and determines the data quantity, the modulation scheme, the interleave pattern, and the like from the difference in the propagation environment (propagation quality) of the local station and the other station (repeater 700).

Procedure 4: Each of the repeaters 700 and 800 segments data of the local station for cooperative relay having reflected the determined data quantity, modulation scheme, and the like into two pieces of data (Step ST302). In the third embodiment, initial transmission data including a systematic bit is represented by Sx, and transmission data including a parity bit is represented by Px (where x corresponds to a repeater number). Description will be provided as to a case where data for cooperative relay is segmented into two pieces of data.

Procedure 5: The repeater 800 transmits initial transmission data S2 of the local station to the repeater 700, and the repeater 700 receives initial transmission data S2 of the other station (repeater 800).

Procedure 6: The base station (eNB) 900 also receives initial transmission data S2 transmitted to the repeater 700.

Procedure 7: The repeater 700 transmits interleaved data S1+S2 including received initial transmission data S2 of the other station (repeater 700) and initial transmission data S1 of the local station to the repeater 800. The repeater 800 receives initial transmission data S1+S2 after interleaving.

Procedure 8: The base station (eNB) 900 also receives initial transmission data S1+S2 after interleaving transmitted to the repeater 800.

Procedure 9: The repeater 800 transmits an ACK signal to the repeater 700.

Procedure 10: The repeater 700 transmits an ACK signal to the repeater 800.

Procedure 11: When the difference in the propagation environment (propagation quality) between each of the repeaters and the base station is equal to or greater than a predetermined value, relay data processing is performed for compensating for data of at least a portion of data to be transmitted from one repeater to the base station and data to be transmitted from the other repeater to the base station for cooperative relay in accordance with the difference in propagation quality between the base station and each of the wireless communication apparatuses.

Specifically, when the difference in the propagation environment (propagation quality) between the base station (eNB) 900 and each of the repeaters 700 and 800 is equal to or greater than the predetermined value, the repeater 800 applies interleaving to received initial transmission data S1+S2 after interleaving to extract initial transmission data S1 of the other station (repeater 700), and generates parity data P1-1, P1-2, . . . having reflected propagation environment (propagation quality) of the repeaters obtained in Procedure 1 from initial transmission data S1 of the other station (repeater 700). For example, it is possible to generate parity data while reflecting the propagation environment (propagation quality) of each of the repeaters on the basis of the standards of the quantity and type of data and the like. Parity data P2-1, P2-2, . . . having reflected the propagation environment (propagation quality) (quantity, type, and the like) are generated from initial transmission data S2 of the local station in the same manner.

Procedure 12: The repeater 800 applies interleaving to all pieces of generated parity data P1-1, P1-2, . . . , P2-1, P2-2, . . . and segments data into two pieces of data to generate parity data P1' and P2' after interleaving.

Procedure 13: The repeater 700 generates parity data P2-1, P2-2, . . . having reflected the propagation environment (propagation quality) (quantity, type, and the like) obtained in Procedure 1 from received initial transmission data S2 of the other station (repeater 800). Parity data P1-1, P1-2, . . . having reflected the propagation environment (propagation quality) (quantity, type, and the like) are generated from initial transmission data S1 of the local station in the same manner.

Procedure 14: The repeater 700 applies interleaving to all pieces of generated parity data P1-1, P1-2, . . . , P2-1, P2-2, . . . and segments data into two pieces of data to generate parity data P1' and P2' after interleaving.

Procedure 15: The repeater 800 transmits generated P1' to the base station (eNB) 900.

Procedure 16: The repeater 700 transmits generated P2' to the base station (eNB) 900.

Procedure 17: The base station (eNB) 900 decodes received data.

Procedure #9: When the difference in the propagation environment (propagation quality) between the base station (eNB) and each of the repeaters is smaller than the predetermined value, the repeater 800 generates parity data P1 from received S1.

Procedure #10: The repeater 700 generates parity data P2 from received S2.

Procedure #11: The repeater 800 transmits generated P1 to the base station (eNB) 900.

Procedure #12: The repeater 700 transmits generated P2 to the base station (eNB) 900.

Procedure #13: The base station (eNB) 900 decodes received data.

Next, processing for cooperative relay of each of the repeaters 700 and 800 and the base station (eNB) 900 in the third embodiment will be described with reference to FIGS. 16 and 17.

The base station (eNB) 900 performs resource allocation to the repeaters 700 and 800 participating in corporate relay and gives propagation environment (propagation quality) notification to the repeaters (Step ST301). The repeater 700 segments data for cooperative relay into two pieces of initial transmission data S1 and parity data P1 of the local station. Similarly, the repeater 800 also segments data for cooperative relay into two pieces of initial transmission data S2 and parity data P2 of the local station (Step ST302).

The repeater 700 transmits initial transmission data S1 of the local station to the repeater 800, and the repeater 800 transmits initial transmission data S2 of the local station to the repeater 700 (Step ST303). The repeater 800 transmits ACK to the repeater 700, and the repeater 700 transmits ACK to the repeater 800 (Step ST304).

Next, it is determined whether or not the difference in the propagation environment (propagation quality) between the base station (eNB) 900 and each of the repeaters 700 and 800 is equal to or greater than a predetermined value (Step ST305). When the difference in the propagation environment (propagation quality) between the base station (eNB) 900 and each of the repeaters is equal to or greater than the predetermined value, the process progresses to Step ST306, it is determined whether or not propagation quality of the repeater 700 is good (Step ST306). With regard to the difference in the propagation environment (propagation quality) between the base station (eNB) 900 and each of the repeaters 700 and 800, resource allocation is performed and propagation environment (propagation quality) notification is given in advance from the base station to the repeaters 700 and 800 participating in cooperative relay.

When propagation quality of the repeater 700 is good, the repeater 800 transmits initial transmission data S2 of the local station to the repeater 700, and simultaneously the base station (eNB) 900 receives initial transmission data S2 of the repeater 800 (Step ST307).

Meanwhile, the repeater 700 integrates and applies interleaving to initial transmission data S1 of the local station and received initial transmission data S2 of the other station (repeater 800) to regenerate initial transmission data S1+S2. Then, regenerated initial transmission data S1+52 after interleaving is transmitted to the repeater 800, and simultaneously initial transmission data S1+S2 after interleaving is also transmitted to the base station (eNB) 900 (Step ST308). The repeater 800 transmits ACK to the repeater 700, and the repeater 700 transmits ACK to the repeater 800 (Step ST309).

Next, the repeater 800 generates parity data P1-1, P2-2, . . . having reflected the difference in the propagation environment from received initial transmission data S1 of the other station (repeater 700) (Step ST310). The repeater 800 generates parity data P1-1, P2-2, . . . having reflected the difference in the propagation environment from initial transmission data S2 of the local station (Step ST311).

The repeater 700 generates parity data P2-1, P2-2, . . . having reflected the difference in the propagation environment from received initial transmission data S2 of the other station (repeater 800) (Step ST312). The repeater 700 generates parity data P1-1, P1-2, . . . having reflected the difference in the propagation environment from initial transmission data S1 of the local station (Step ST313).

The repeater 800 applies interleaving to all pieces of parity data P1-1, P1-2, . . . , P2-1, P2-2, . . . and segments data into two pieces of data as parity data P1' and P2' after interleaving (Step ST314).

The repeater 800 transmits generated parity data P1' to the base station (eNB) 900 (Step ST315), and the repeater 700 transmits generated parity data P2' to the base station (eNB) 900 (Step ST316).

When propagation quality of the repeater 700 is not good, the process progresses from Step ST306 to Step ST307, the repeater 700 transmits initial transmission data S1 of the local station to the repeater 800, and simultaneously the base station (eNB) 900 receives initial transmission data S1 of the repeater 700 (Step ST317).

Meanwhile, the repeater 800 integrates and applies interleaving to initial transmission data S2 of the local station and received initial transmission data S1 of the other station (repeater 700) to regenerate initial transmission data S1+S2 and transmits initial transmission data S1+S2 to the repeater 700. Simultaneously, the base station (eNB) 900 transmits initial transmission data S1+S2 (Step ST318). Thereafter, the process progresses to Step ST309, and the same processing as when propagation quality of the repeater 700 is good is performed.

In Step ST305, when the difference in the propagation environment (propagation quality) between the base station (eNB) 900 and each of the repeaters is smaller than the predetermined value, the process progresses from Step ST305 to Step ST319, not Step ST306 (see FIG. 17). Then, the repeater 700 transmits S1 to the repeater 800, and the repeater 800 transmits S2 to the repeater 700. Simultaneously, the base station (eNB) 900 receives S1 and S2 (Step ST319).

Meanwhile, the repeater 800 transmits ACK to the repeater 700, and the repeater 700 transmits ACK to the repeater 800 (Step ST320).

Next, the repeater 800 generates parity data P1 from received S1 (Step ST321), and the repeater 700 generates parity data P2 from received S2 (Step ST322).

Next, the repeater 800 transmits generated parity data P1 to the base station (eNB) 900 (Step ST323), and the repeater 700 transmits generated parity data P2 to the base station (eNB) 900 (Step ST324).

Finally, the base station (eNB) 900 decodes received data (Step ST325).

As described above, in the third embodiment, initial transmission data S1 and S2 of both repeaters are sent through a path with a good propagation environment (propagation quality), improving reception performance of initial transmission data including systematic bits S1 and S2 as important bits at the base station (eNB) 900.

Next, the operation of the repeater 700 will be described.

Figure 18:
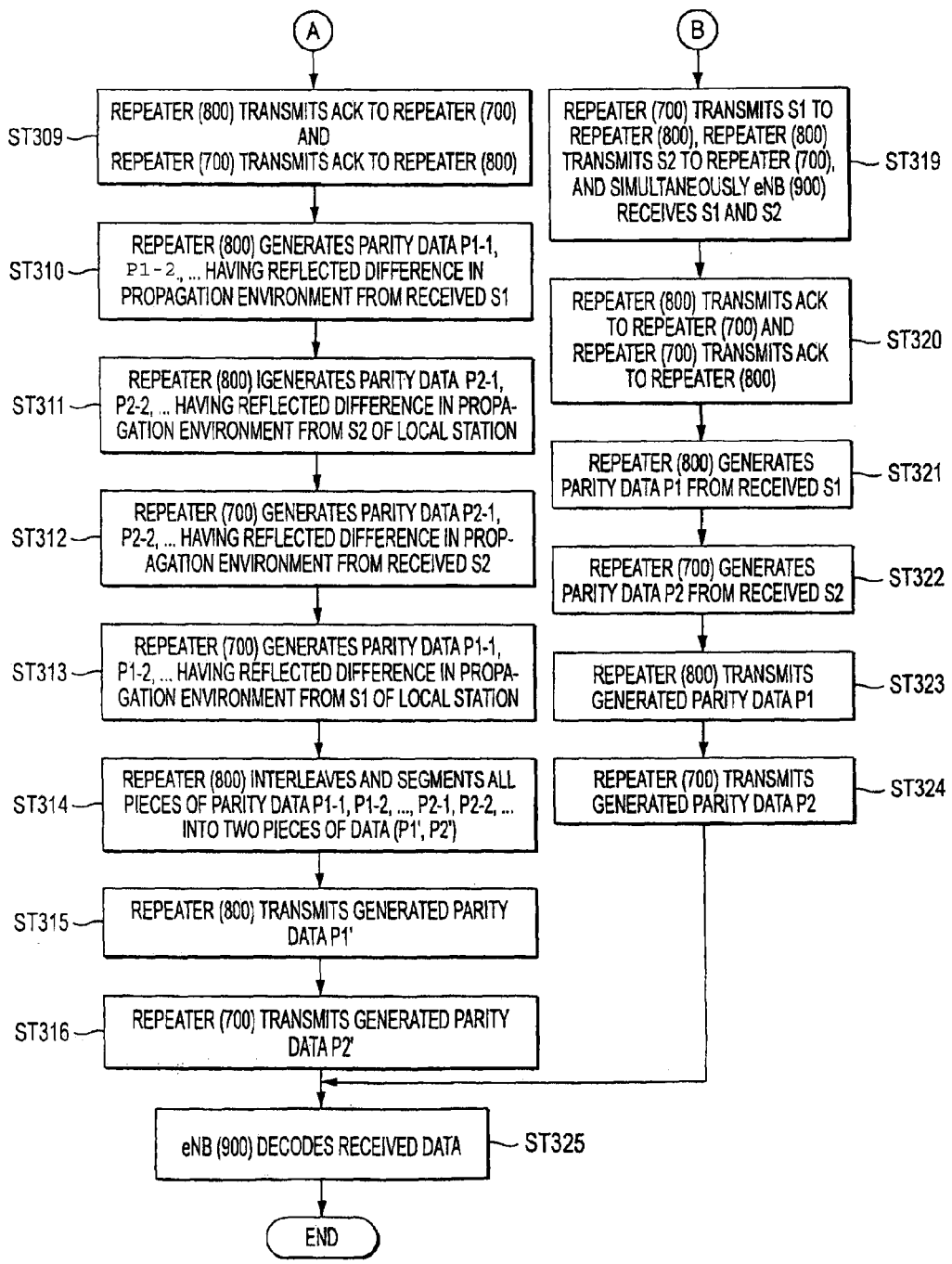
FIG. 18 is a diagram showing the processing flow of cooperative relay according to the third embodiment.

FIG. 18 is a functional block diagram of the repeater 700 according to the third embodiment.

Figure 20:
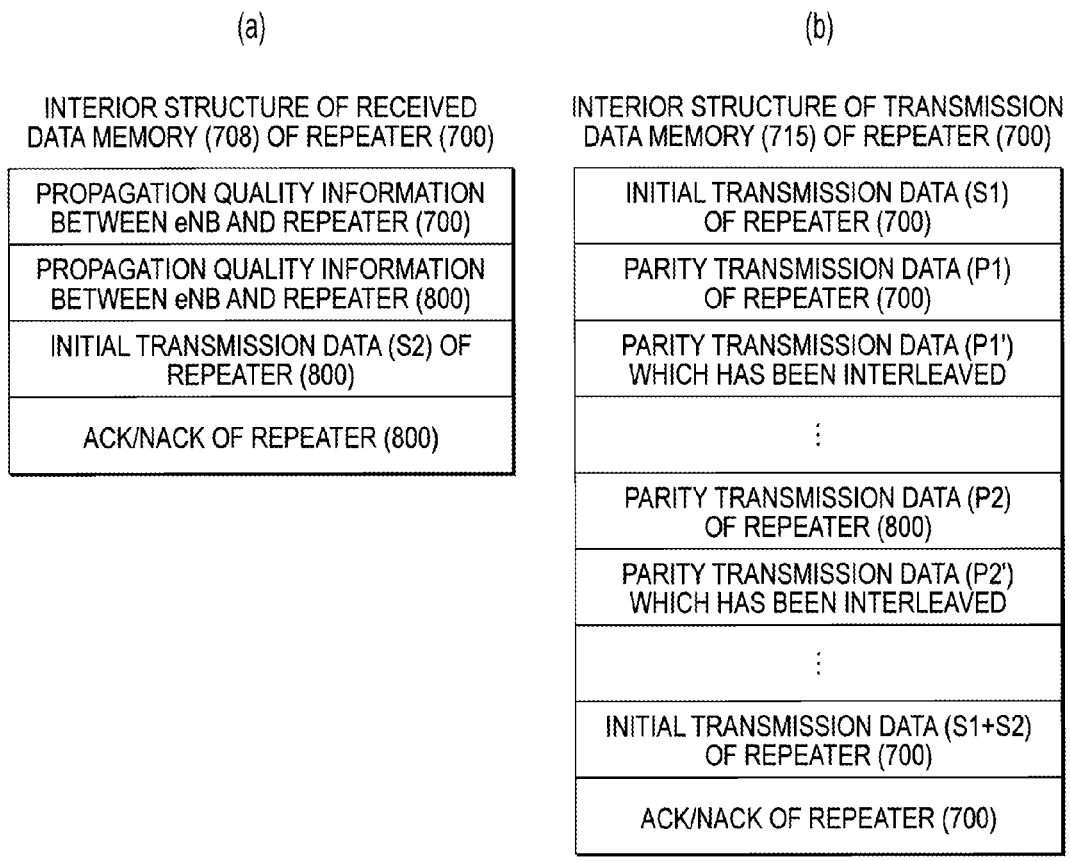
FIG. 20 shows the interior structure of each memory of the repeater 700 according to the third embodiment, specifically.

As shown in FIG. 18, the repeater 700 includes a reception RF section 701, an A/D conversion section 702, buffers 703 and 716, a demodulation section 704, a deinterleave section 706, switches 705A and 705B, a channel decoding section 707, a received data memory 708, an ACK/NACK signal generating section 709, a propagation quality difference determination section 710, a channel encoding section 711, switches 712A and 712B, an interleave section 713, a modulation section 714, a transmission data memory 715, a D/A conversion section 717, and a transmission RF section 718. FIG. 20 shows the interior structure of a memory of the repeater 700. FIG. 20(*a*) is a diagram showing the interior structure of the received data memory 708, and FIG. 20(*b*) is a diagram showing the interior structure of the transmission data memory 715.

An operation until the repeater 700 completes transmission of one block of data through cooperative relay will be described.

The repeater 700 receives "propagation quality information from the base station (eNB) toward the repeater 700 and propagation quality information from the base station (eNB) toward repeater 800" by the reception RF section 701. The received signals are downconverted to a baseband by the reception RF section 701, and the signals are input to the A/D conversion section 702. The signals input to the A/D conversion section 702 are converted to digital signals and accumulated in the buffer 703. The signals including propagation quality information are subjected to processing for demodulation by the demodulation section 704 and channel decoding by the channel decoding section 707 and then stored in the received data memory 708.

Figure 19:
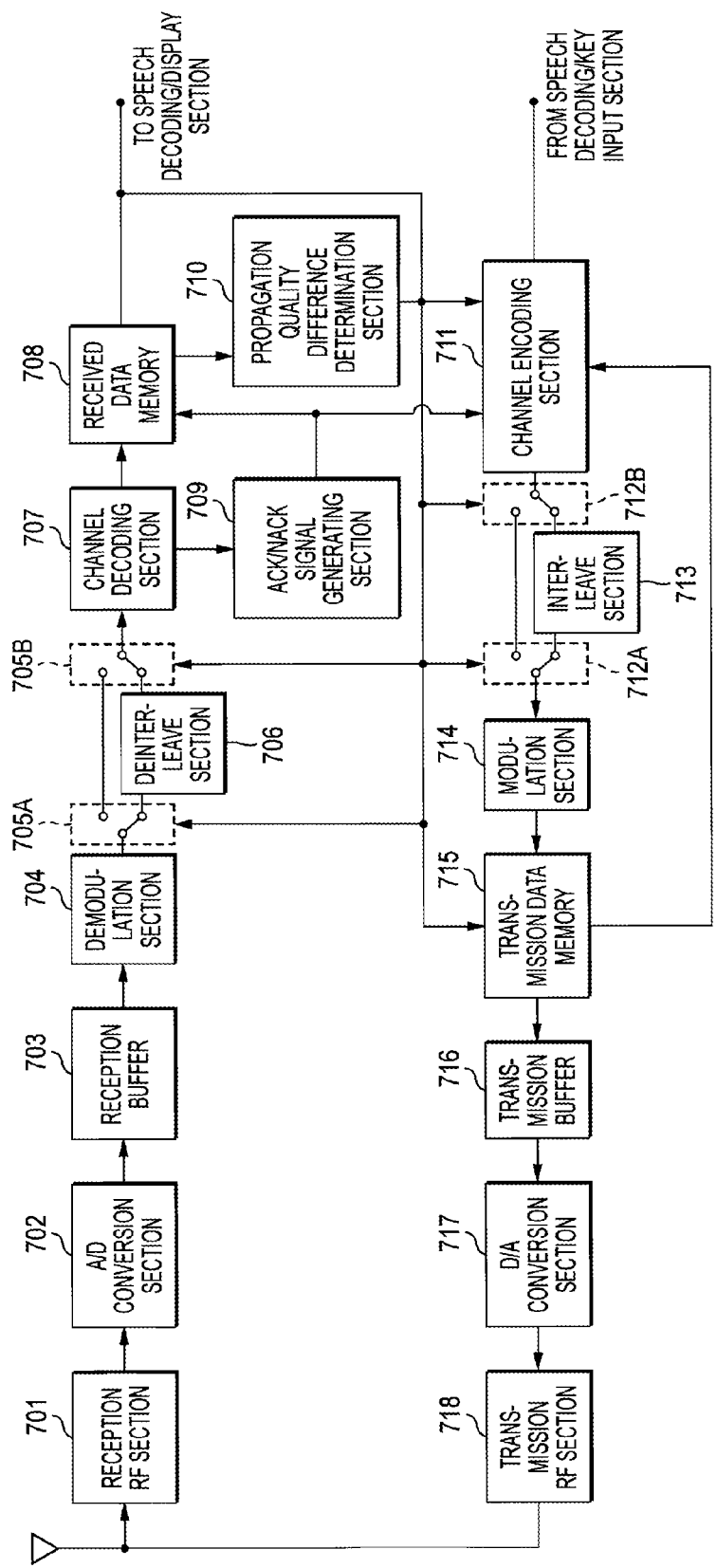
FIG. 19 is a functional block diagram of a repeater 700 according to the third embodiment.

As shown in FIG. 19, the repeater 700 segments transmission data of the local station to be relayed to the base station into initial transmission data S1 including a systematic bit and parity transmission data P1 including a parity bit, and stores initial transmission data S1 and parity transmission data P1 in the transmission data memory 715.

Subsequently, "propagation quality information between the base station (eNB) 900 and the repeater 700 and propagation quality information between the base station (eNB) 900 and the repeater 800" stored in the received data memory 708 are read, and the propagation quality difference determination section 710 determines whether or not the difference in propagation quality between the base station (eNB) and each of the repeaters is equal to or greater than a predetermined value. The propagation quality difference determination section 710 determines whether or not one of propagation quality between the base station (eNB) 900 and the repeater 700 and propagation quality between the base station (eNB) 900 and the repeater 800 is good.

When the difference in propagation quality between the base station (eNB) and each of the repeaters calculated by the propagation quality difference determination section 710 is equal to or greater than the predetermined value, and when propagation quality between the base station (eNB) 900 and the repeater 700 is good, the repeater 700 performs switching control of the switches 705A and 705B in front of and at the back of the deinterleave section 706 such that the received signal does not pass through the deinterleave section 706. Meanwhile, the repeater 700 performs switching control of the switches 712A and 712B in front of and at the back of the interleave section 713 such that the received signal passes through the interleave section 713 (see FIG. 19).

The reception RF section 701 receives initial transmission data S2 of the other station from the repeater 800 before the repeater 700 transmits initial transmission data S1 of the local station to the repeater 800. The reception RF section 701 downconverts received initial transmission data S2 of the other station to a baseband.

Next, initial transmission data S2 of the other station is input to the A/D conversion section 702. Initial transmission data S2 of the other station input to the A/D conversion section 702 is converted to a digital signal and accumulated in the reception buffer 703. Then, initial transmission data S2 of the other station is subjected to processing for demodulation by the demodulation section 704, then input directly to the channel decoding section 707 without passing through the deinterleave section 706, and subsequently subjected to processing for channel decoding. Thereafter, initial transmission data S2 of the other station is stored in the received data memory 708.

The ACK/NACK signal generating section 709 generates the ACK/NACK signal in accordance with the result (CRC and the like) of processing for channel-decoding initial transmission data S2 of the other station. When reception of initial transmission data S2 of the other station is successful, the ACK signal is generated, and when reception fails, the NACK signal is generated. The generated ACK/NACK signal of the repeater 700 is subjected to processing for channel encoding by the channel encoding section 711, then subjected to processing for modulation by the modulation section 714, and subsequently stored in the transmission data memory 715.

Next, initial transmission data S2 of the other station stored in the received data memory 708 and initial transmission data S1 of the local station read from the transmission data memory 715 are integrated and subjected to processing for channel encoding by the channel encoding section 711. Then, the interleave section 713 applies interleaving, and the modulation section 714 performs processing for modulation. Initial transmission data S1+S2 after interleaving having subjected to the processing is stored in the transmission data memory 715. Thereafter, initial transmission data S1+S2 is again read, accumulated in the transmission buffer 716, D/A converted by the D/A conversion section 717, upconverted to a signal in an RF band by the transmission RF section 718, and transmitted from the transmitting antenna.

Next, the repeater 700 reads decoded data of initial transmission data S2 of the other station stored in the received data memory 708. When the difference in propagation quality between the base station (eNB) and each of the repeaters calculated by the propagation quality difference determination section 710 is equal to or greater than a predetermined value, the channel encoding section 711 generates parity data P2-1, P2-2, . . . of initial transmission data S2 of the other station in accordance with the difference in propagation quality between the base station (eNB) and each of the repeaters. The channel encoding section 711 generates parity data P1-1, P1-2, . . . of the local station from decoded data of initial transmission data S1 of the local station read from the transmission data memory 715 in accordance with propagation quality difference information between the base station (eNB) and each of the repeaters.

Next, the repeater 700 applies interleaving to parity data P1-1, P1-2, ..., P2-1, P2-2, ... generated by the channel encoding section 711 and segments data into two pieces of data on the basis of the difference in propagation quality between the base station (eNB) and each of the repeaters to generate parity data P1' and P2' after interleaving.

Next, generated parity data P1' and P2' after interleaving is subjected to modulation by the modulation section 714 and then stored in the transmission data memory 715.

The repeater 700 reads parity transmission data P1' after interleaving from the transmission data memory 715 and accumulates parity transmission data P1' in the buffer 716. Thereafter, parity transmission data P1' is D/A converted by the D/A conversion section 717 and upconverted to a signal in an RF band by the transmission RF section 718. Parity transmission data P1' after interleaving is transmitted from the transmitting antenna to the base station.

When the difference in propagation quality between the base station (eNB) and each of the repeaters calculated by the propagation quality difference determination section 710 is equal to or greater than a predetermined value, and when propagation quality between the base station (eNB) 900 and the repeater 800 is good, the repeater 700 performs switching control of the switches 705A and 705B in front of and at the back of the deinterleave section 706 such that the received signal passes through the deinterleave section 706, and performs switching control of the switches 712A and 712B in front of and at the back of the interleave section 713 such that the received signal passes through the interleave section 713.

The repeater 700 transmits initial transmission data S1 of the local station to the repeater 800 before the repeater 800 transmits initial transmission data S2 of the local station to the repeater 700. The repeater 700 reads initial transmission data S1 of the local station from the transmission data memory 715, and performs processing for channel-encoding initial transmission data S1 of the local station read from the channel encoding section 711. Thereafter, initial transmission data S1 is subjected to processing for modulation by the modulation section 714, accumulated in the transmission buffer 716, D/A converted by the D/A conversion section 717, upconverted to a signal in an RF band by the transmission RF section 718, and transmitted from the transmitting antenna.

Subsequently, the reception RF section 701 receives initial transmission data S2 of the other station.

Received initial transmission data S2 is downconverted to a baseband by the reception RF section 701 and input to the A/D conversion section 702. Initial transmission data S2 of the other station input to the A/D conversion section 702 is converted to a digital signal and accumulated in the reception buffer 703. Then, initial transmission data S2 of the other station are subjected to processing for modulation by the demodulation section 704, deinterleaving by the deinterleave section 706, and channel decoding by the channel decoding section 707, and then stored in the received data memory 708.

The ACK/NACK signal generating section 709 generates the ACK/NACK signal in accordance with the result (CRC and the like) of processing for channel-decoding initial transmission data S2 of the other station. If reception of initial transmission data S2 of the other station is successful, the ACK signal is generated, and if reception fails, the NACK signal is generated. The generated ACK/NACK signal of the repeater 700 is subjected to processing for channel encoding by the channel encoding section 711, then subjected to processing for modulation by the modulation section 714, and subsequently stored in the transmission data memory 715.

Next, initial transmission data S2 of the other station stored in the received data memory 708 and initial transmission data S1 of the local station read from the transmission data memory 715 are integrated and subjected to processing for channel encoding by the channel encoding section 711. The interleave section 713 applies interleaving, and the modulation section 714 performs processing for modulation. Then, initial transmission data S1+S2 after interleaving subjected to the processing is stored in the transmission data memory 715. Thereafter, initial transmission data S1+S2 is again read, accumulated in the transmission buffer 716, D/A converted by the D/A conversion section 717, upconverted to a signal in an RF band by the transmission RF section 718, and transmitted from the transmitting antenna.

Next, the repeater 700 reads decoded data of initial transmission data S2 of the other station stored in the received data memory 708. When the difference in propagation quality between the base station (eNB) and each of the repeaters calculated by the propagation quality difference determination section 710 is equal to or greater than the predetermined value, the channel encoding section 711 generates parity data P2-1, P2-2, ... of the other station from decoded data of initial transmission data S2 of the other station in accordance with the difference in propagation quality between the base station (eNB) and each of the repeaters. The channel encoding section 711 generates parity data P1-1, P1-2, ... of the local station from decoded data of initial transmission data S1 of the local station read from the transmission data memory 715 in accordance with propagation quality difference information between the base station (eNB) and each of the repeaters.

Next, the repeater 700 applies interleaving to parity data P1-1, P1-2, ..., P2-1, P2-2, ... generated by the channel encoding section 711 on the basis of the difference in propagation quality between the base station (eNB) and each of the repeaters by the interleave section 713 and segments data into two pieces of data to generate parity data P1' and P2' after interleaving.

Next, generated parity data P1' and P2' after interleaving are subjected to modulation by the modulation section 714 and then stored in the transmission data memory 715.

The repeater 700 reads parity transmission data P1' after interleaving from the transmission data memory 715 and accumulates parity transmission data P1' in the buffer 716. Parity transmission data P1' is D/A converted by the D/A conversion section 717, upconverted to a signal in an RF band by the transmission RF section 718, and transmitted from the transmitting antenna.

<When Difference in Propagation Quality is Smaller than Predetermined Value>

Meanwhile, when the difference in propagation quality between the base station (eNB) and each of the repeaters calculated by the propagation quality difference determination section 710 is smaller than the predetermined value, the repeater 700 performs switching control of the switches 705A and 705B in front of and at the back of the deinterleave section 706 such that the received signal does not pass through the deinterleave section 706, and similarly performs switching control of the switches 712A and 712B in front of and at the back of the interleave section 713 such that the received signal does not pass through the interleave section 713.

Next, the repeater 700 reads initial transmission data S1 of the local station from the transmission data memory 715, and read initial transmission data S1 of the local station is subjected to processing for channel encoding by the channel encoding section 711 and modulation by the modulation section 714. Then, the repeater 700 accumulates initial transmission data S1 of the local station in the transmission buffer 716. Thereafter, initial transmission data S1 is D/A converted by the D/A conversion section 717, upconverted to a signal in an RF band by the transmission RF section 718, and transmitted from the transmitting antenna.

Subsequently, the reception RF section 701 receives initial transmission data S2 of the other station. Received initial transmission data S2 of the other station is downconverted to a baseband by the reception RF section 701 and input to the ND conversion section 702. Initial transmission data S2 of the other station input to the A/D conversion section 702 is converted to a digital signal of the other station and accumulated in the reception buffer 703. Initial transmission data S2 of the other station is subjected to processing for demodulation by the demodulation section 704, then subjected to processing for channel decoding by the channel decoding section 707, without passing through the deinterleave section 706, and subsequently stored in the received data memory 708.

The ACK/NACK signal generating section 709 generates the ACK/NACK signal in accordance with the result (CRC and the like) of processing for channel-decoding initial transmission data S2 of the other station. If reception of initial transmission data S2 of the other station is successful, the ACK signal is generated, and if reception fails, the NACK signal is generated. The generated ACK/NACK signal of the repeater 700 is subjected to processing for channel encoding by the channel encoding section 711, then subjected to processing for modulation by the modulation section 714, and subsequently stored in the transmission data memory 715.

Next, the reception RF section 701 receives the ACK/NACK signal of the repeater 800. The received ACK/NACK signal of the repeater 800 is downconverted to a baseband by the reception RF section 701 and input to the A/D conversion section 702. The ACK/NACK signal input to the A/D conversion section is converted to a digital signal and accumulated in the buffer 703. The ACK/NACK signal of the repeater 800 is subjected to processing for demodulation and channel decoding, and stored in the received data memory 708.

Subsequently, the ACK/NACK signal of the repeater 700 is read from the transmission data memory 715, and the read ACK/NACK signal of the repeater 700 is accumulated in the buffer 716. Thereafter, the ACK/NACK signal is D/A converted by the D/A conversion section 717, upconverted to a signal in an RF band by the transmission RF section 718, and transmitted from the transmitting antenna.

The repeater 700 generates a parity bit P2 from initial transmission data S2 of the other station stored in the received data memory 708 by the channel encoding section 711 and the modulation section 714, and stores the parity bit P2 in the transmission data memory 715.

Next, the repeater 700 reads parity transmission data P2 of the other station from the transmission data memory 715 and accumulates read parity transmission data P2 of the other station in the buffer 716. Thereafter, parity transmission data P2 is D/A converted by the D/A conversion section 717, upconverted to a signal in an RF band by the transmission RF section, and transmitted from the transmitting antenna.

Next, the operation of the base station 900 will be described.

Figure 21:
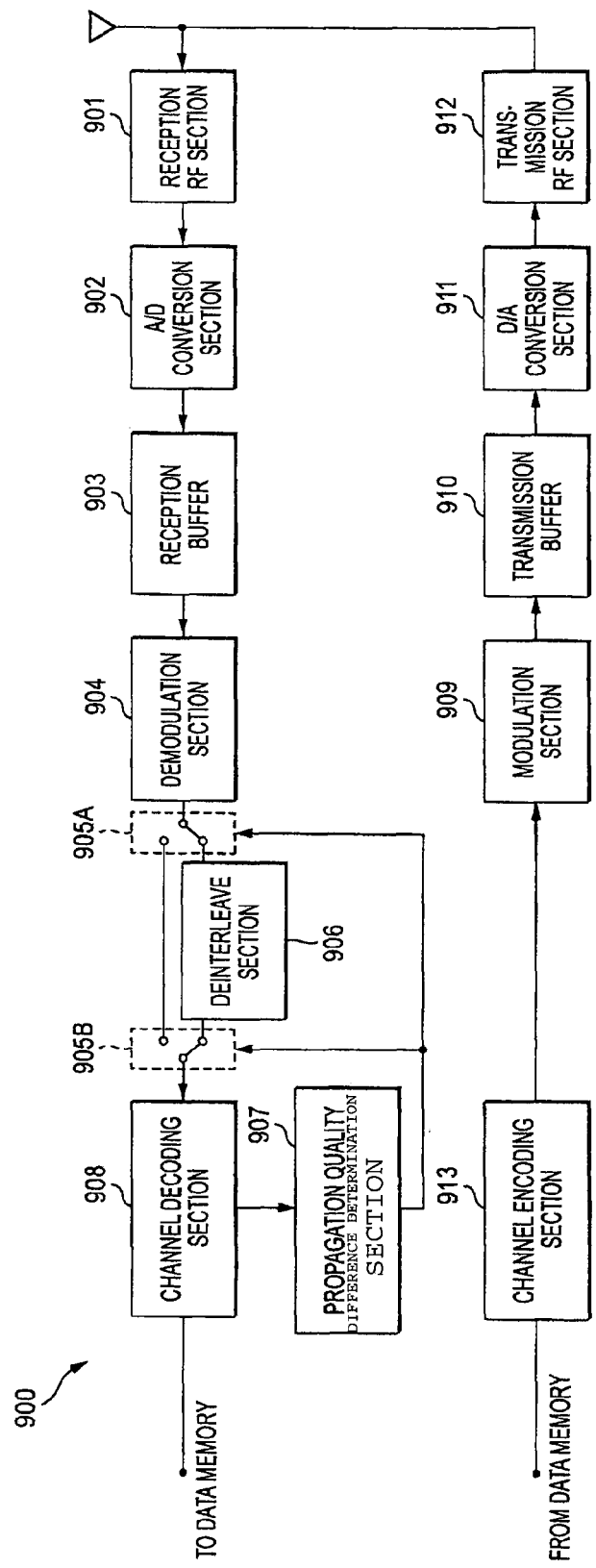
FIG. 21 is a functional block diagram of a base station 900 according to the third embodiment.
Figure 22:
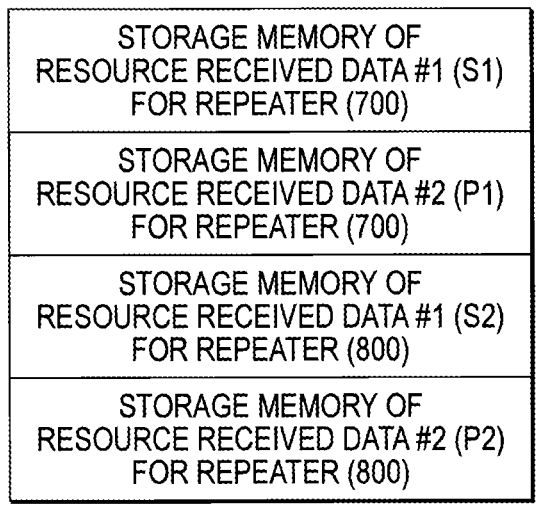
FIG. 22 is a diagram showing the interior structure of a reception buffer 903 of the base station 900 according to the third embodiment.
Figure 23:
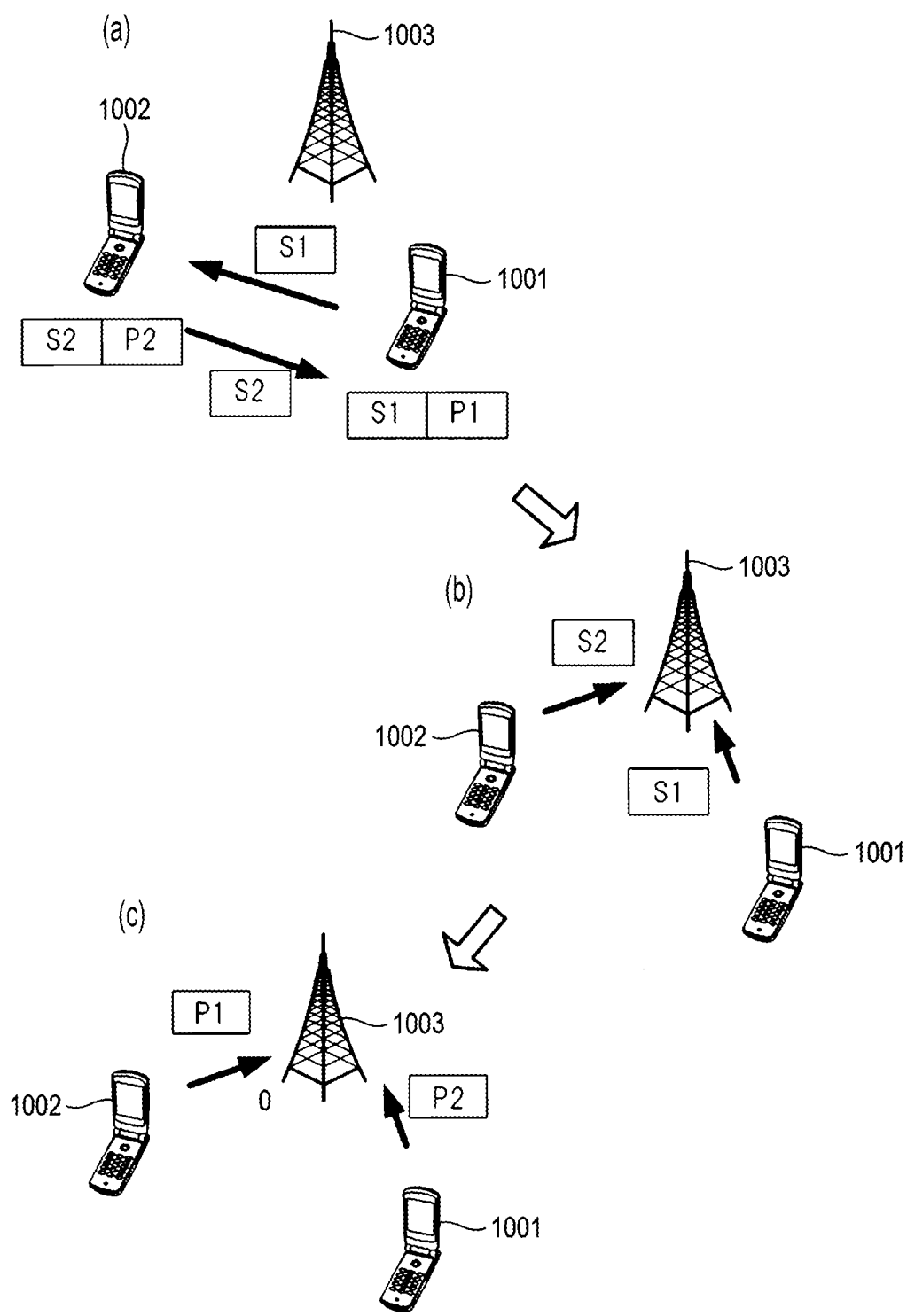
FIG. 23 is a schematic view of a cooperative relay system which carries out cooperative relay between repeaters 1001 and 1002 and a base station 1003.
Figure 24:
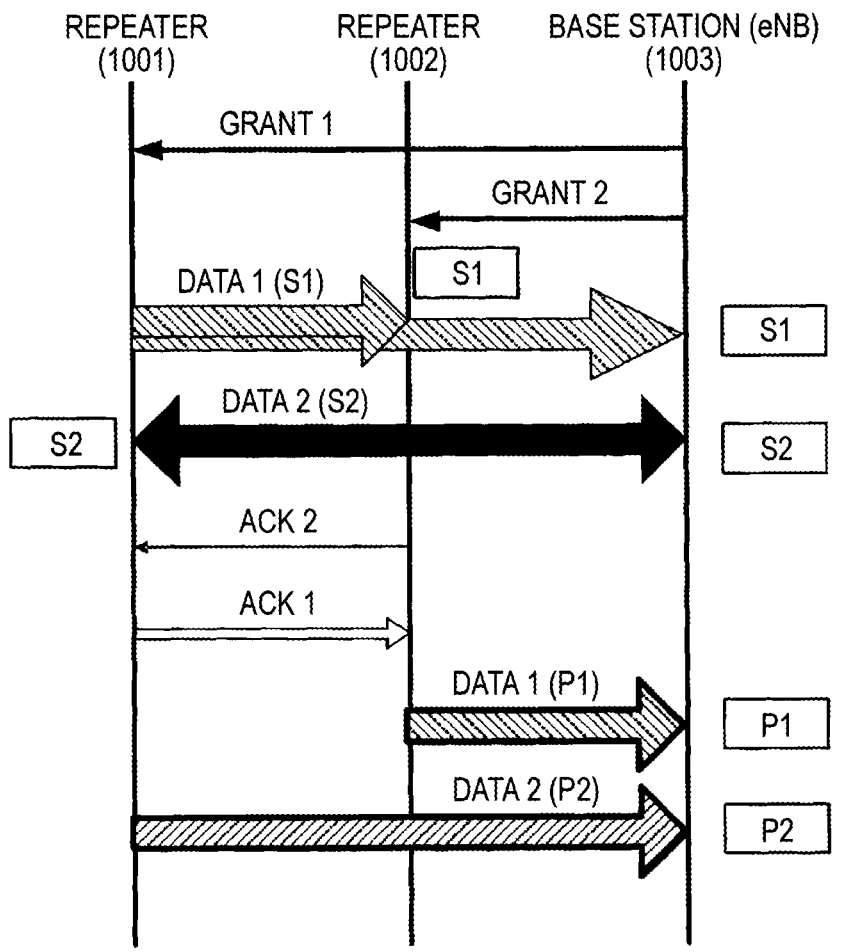
FIG. 24 shows an operation example of the cooperative relay system of FIG. 23.
Figure 25:
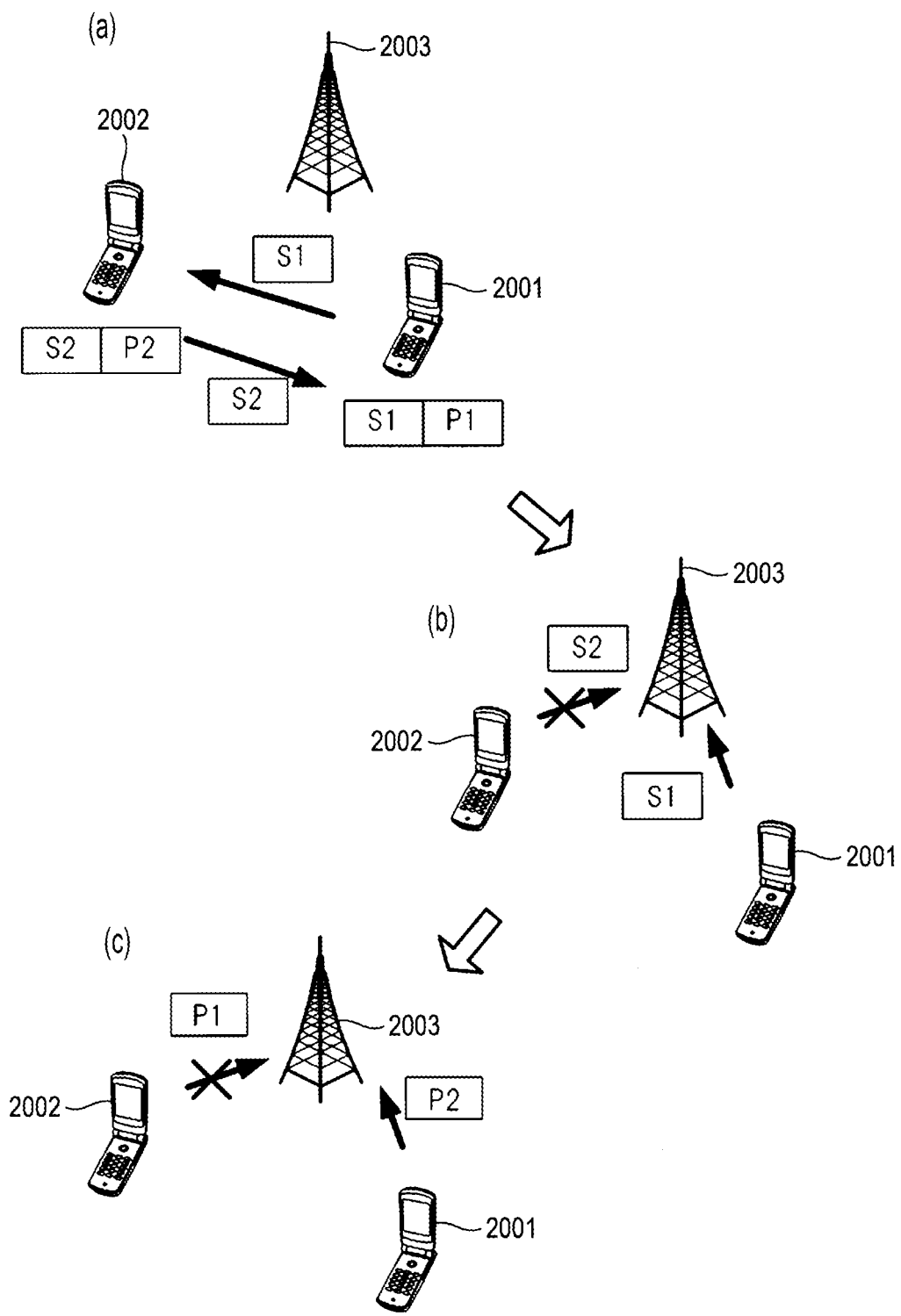
FIG. 25 is a schematic view of a cooperative relay system when there is a difference in the propagation environment (propagation quality) between a base station (eNB) 2003 and each of repeaters 2001 and 2002.
Figure 26:
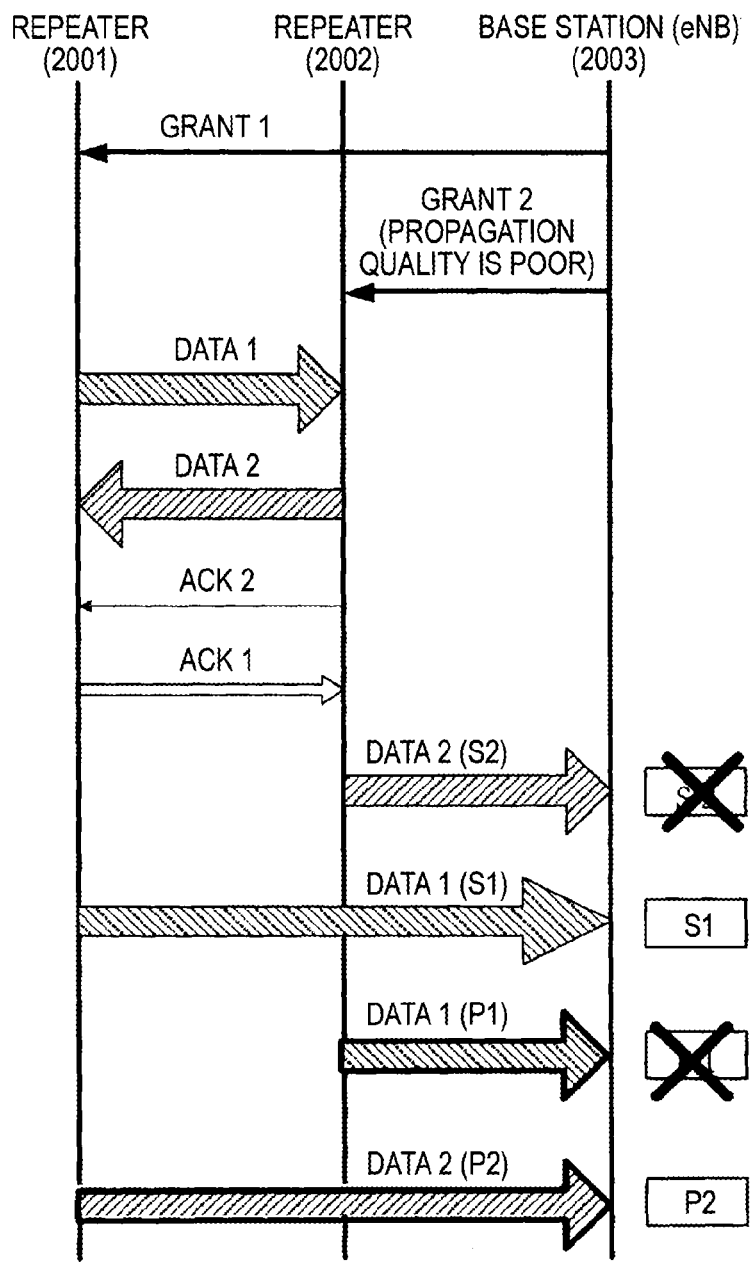
FIG. 26 shows an operation example of the cooperative relay system of FIG. 25.

FIG. 21 is a functional block diagram of the base station 900 according to the third embodiment. The base station 900 includes a reception RF section 901, an A/D conversion section 902, a reception buffer 903, a transmission buffer 911, a demodulation section 904, switches 905A and 905B, a deinterleave section 906, a propagation quality difference determination section 907, a channel decoding section 908, a modulation section 909, a transmission buffer 910, a D/A conversion section 911, a transmission RF section 912, and a channel decoding section 913. FIG. 22 is a diagram showing the interior structure of the reception buffer 903 of the base station 900.

An operation until the base station completes reception of one block of data through cooperative relay will be described in detail with reference to FIG. 21. The base station 900 (eNB) performs upward propagation quality estimation of the repeaters 700 and 800 participating in cooperative relay, and notifies the propagation quality estimation results of the propagation quality difference determination section 907 to the repeaters 700 and 800 participating in cooperative relay together with resource allocation.

Subsequently, the base station (eNB) 900 receives initial transmission data S1 and S2 at the time of data exchange between the repeaters participating in cooperative relay by the reception RF section 901. The received signals are downconverted to a baseband by the reception RF section 901, and the signals are input to the A/D conversion section 902. The signals input to the ND conversion section 902 are converted to digital signals. Then, as shown in FIG. 20(b), initial transmission data S1 of the repeater 700 is stored in "a storage memory of resource received data #1 (S1) for the repeater 700" of the reception buffer 903, and initial transmission data S2 of the repeater 800 is stored in "a storage memory of resource received data #1 (S2) for the repeater 800".

The base station (eNB) 900 receives parity data (P1 and P2 or P1' and P2') transmitted from the repeaters participating in cooperative relay by the reception RF section 901. The received signals are downconverted to a baseband by the reception RF section 901, and the signals are input to the A/D conversion section 902. The signals input to the A/D conversion section 902 are converted to digital signals and, as shown in FIG. 20(b), stored in the reception buffer 903 as resource received data P1 for the repeater 700 and resource received data P2 for the repeater 800. If a desired quantity of data (data received from a resource for the repeater 700 two times and data received from a resource for the repeater 800 two times) is accumulated in the reception buffer 903, S1, P1, S2, and P2 are individually demodulated.

When the difference in propagation quality is equal to or greater than the predetermined value, and when propagation quality of the repeater 700 is good, initial transmission data S1 and S2 and parity data P1 and P2 received from the repeaters are demodulated. Thereafter, the deinterleave section 906 applies deinterleaving to initial transmission data S1 of the repeater 700, such that initial transmission data S1 is segmented into original initial transmission data S1 and S2. The deinterleave section also integrates and applies deinterleaving to parity data P1 and P2 to obtain parity data P1-1, P1-2, . . . , P2-1, P2-2, . . . . Subsequently, initial transmission data S1 and parity data P1-1, P1-2, . . . for the repeater 700 and initial transmission data S2 and parity data P2-1, P2-2, . . . for the repeater 800 are channel-decoded by the channel decoding section 909, obtaining desired data.

Meanwhile, when the difference in propagation quality is equal to or greater than the predetermined value, and when propagation quality of the repeater 800 is good, initial transmission data S1 and S2 and parity data P1 and P2 received from the repeaters are demodulated. Thereafter, the deinterleave section applies deinterleaving to initial transmission data S2 of the repeater 800, such that initial transmission data S2 is segmented into original initial transmission data S1 and S2. The deinterleave section also integrates and applies deinterleaving to parity data P1 and P2 to obtain parity data P1-1, P1-2, . . . , P2-1, P2-2, . . . . Subsequently, initial transmission data S1 and parity data P1-1, P1-2, . . . for the repeater 700 and initial transmission data S2 and parity data P2-1, P2-2, . . . for the repeater 800 are channel-decoded by the channel decoding section 908, obtaining desired data.

When the difference in propagation quality is smaller than the predetermined value, the signals S1, P1, S2, and P2 received from the repeaters are demodulated. Thereafter, initial transmission data S1 and parity data P1 for the repeater 700 and initial transmission data S2 and parity data P2 for the repeater 800 are channel-decoded by the channel decoding section 908, obtaining desired data.

In the third embodiment, initial transmission data of both the repeaters 700 and 800 is sent through a path with a good propagation environment (propagation quality). For this reason, it is possible to improve reception performance of initial transmission data including a systematic bit as an important bit at the base station (eNB) 900.

Although in the third embodiment, data is interleaved to randomize data, other means may be used insofar as the means can randomize data. For example, interleaving with respect to the time axis, hopping with respect to the frequency axis, or scrambling may be used.

In the respective embodiments, the repeaters may be expressed by relay stations, repeaters, simple base stations, and cluster heads.

The respective functional blocks used for describing the above-described embodiments are implemented by an LSI which is typically an integrated circuit. The functional blocks may also be packed individually into a single chip or embodied as a single chip so as to include some or all of the functional blocks. Although the chip is embodied as an LSI, the chip is also referred to as an IC, a system LSI, a super LSI, or an ultra LSI in accordance with the degree of integration.

The technique for implementing an integrated circuit is not limited to the LSI, and may also be implemented by a dedicated circuit or a general-purpose processor. An FPGA (Field Programmable Gate Array) which can be programmed after an LSI is manufactured or a reconfigurable processor which is capable of reconfiguring connections or settings of circuit cells in an LSI may also be utilized.

If a technique of integrating a circuit which is substituted by an LSI emerges by means of another technique resultant from advancement or derivation of the semiconductor technique, the functional blocks may naturally be integrated using the technique. Application of biological techniques and the like is feasible.

Although in the above-described embodiments, an antenna has been described, the invention may be applied to an antenna port. An antenna port indicates a logical antenna which is constituted by one or a plurality of physical antennas. That is, the antenna port is not necessarily limited to indicate a single physical antenna, and may indicate an array antenna including a plurality of antennas or the like. For example, in the case of an LTE, the number of physical antennas constituting an antenna port is not defined, and a base station is defined as the minimum unit for transmitting different reference signals. The antenna port may be defined as the minimum unit for multiplication of the weight of a precoding vector.

Although the invention has been described in detail in connection with a specific embodiment, it will be apparent to those skilled in the art that various changes or modifications may be made without departing from the spirit and scope of the invention.

This application is based on Japanese Patent Application (Japanese Patent Application No. 2008-181906) filed on Jul. 11, 2008, the entire subject matter of which is incorporated herein by reference.

Industrial Applicability

The wireless communication apparatus according to the invention can improve data decoding performance at a base station while achieving data exchange between repeaters and initial data transmission to the base station (eNB), and is useful as a wireless communication apparatus or the like.

REFERENCE SIGNS LIST 100, 200, 400, 500, 700, 800: repeater
1001, 1002, 2001, 2002: repeater
300, 600, 900, 1003, 2003: base station (eNB)
101, 301, 401, 601, 701, 901: reception RF section
102, 302, 402, 602, 702, 902: A/D conversion section
103, 114, 303, 311, 403, 414, 703, 716: buffer
104, 304, 404, 604, 704, 904: demodulation section
105, 309, 405, 608, 707, 908, 913: channel decoding section
106, 406, 708: received data memory
107, 307, 407, 607, 710, 907: propagation quality difference determination section
108, 408, 709: ACK/NACK signal generating section
109, 409, 711: channel encoding section
110A, 110B, 305A, 305B, 410A, 410B, 605A: switch
605B, 705A, 705B, 712A, 712B, 905A, 905B: switch
111, 411, 713: interleave section
112, 310, 412, 612, 714, 909: modulation section
113, 413, 715: transmission data memory
115, 312, 415, 610, 717, 911: D/A conversion section
116, 313, 416, 609, 718, 912: transmission RF section
306, 606, 706, 906: deinterleave section
311, 611, 910: transmission buffer
603, 903: reception buffer

The invention claimed is:

1. A wireless communication apparatus that cooperates with another wireless communication apparatus to relay data to a base station, the wireless communication apparatus comprising:
a storage section that stores first data generated by the wireless communication apparatus for performing wireless communication to be transmitted from the wireless communication apparatus;
a receiving section that receives at least a portion of second data to be transmitted by the another wireless communication apparatus;
a relay data processing section that compensates for at least a portion of the first data and the second data for cooperative relay in accordance with a difference in propagation quality between the base station and each of the wireless communication apparatuses; and
a transmitting section that transmits data which has been processed by the relay data processing section to the base station, wherein
said cooperative relay of the second data to the base station is provided by said wireless communication apparatus concurrent with the wireless communication apparatus performing wireless communication of the generated and stored first data.

2. The wireless communication apparatus according to claim 1, wherein the relay data processing section applies interleaving to at least a portion of the first data and the second data in accordance with the difference in the propagation quality between the base station and each of the wireless communication apparatuses.

3. The wireless communication apparatus according to claim 2, wherein each of the first data and the second data is constituted by initial transmission data including a systematic bit and parity data including a parity bit, the wireless communication apparatus further comprises:

a determination section that determines whether or not the difference in the propagation quality between the base station and each of the wireless communication apparatuses is equal to or greater than a predetermined value based on the propagation quality between the base station and the wireless communication apparatus and the propagation quality between the base station and the another wireless communication apparatus; and a data generating section that generates the parity data from the initial transmission data, wherein when the determination section determines that the difference in the propagation quality between the base station and each of the wireless communication apparatuses is equal to or greater than the predetermined value, the relay data processing section applies interleaving to the initial transmission data of the first data, the parity data of the first data, the initial transmission data of the second data received by the receiving section, and the parity data of the second data generated by the data generating section, and the transmitting section transmits data which has been interleaved to the base station.

4. A wireless communication apparatus that cooperates with another wireless communication apparatus to relay data to a base station, the wireless communication apparatus comprising:

a storage section that stores first data transmitted from the wireless communication apparatus and constituted by first initial transmission data including a systematic bit and first parity data including a parity bit;

a receiving section that receives second initial transmission data transmitted from the another wireless communication apparatus, and the second initial transmission data including a systematic bit;

the receiving section being configured to receive propagation quality information from the base station about propagation quality between the wireless communication apparatus and the base station, and also being configured to receive propagation quality information from the base station about propagation quality between the another wireless communication apparatus and the base station;

a determination section that determines whether or not a difference in propagation quality between the base station and each of the wireless communication apparatuses is equal to or greater than a predetermined value based on the propagation quality between the base station and the wireless communication apparatus received from the base station and the propagation quality between the base station and the another wireless communication apparatus received from the base station;

a data generating section that, when the determination section determines that the difference in the propagation quality between the base station and each of the wireless communication apparatuses is equal to or greater than the predetermined value, generates parity data of the first data, in which the difference in the propagation quality between the base station and each of the wireless communication apparatuses is reflected, and parity data of the second data, in which the difference in the propagation quality between the base station and each of the wireless communication apparatuses is reflected, from the first initial transmission data of the first data and the second initial transmission data transmitted from the another wireless communication apparatus;

an interleave section that applies interleaving to the parity data of the first data generated by the data generating section and the parity data of the second data generated by the data generating section; and a transmitting section that transmits data which has been interleaved by the interleave section to the base station.

5. The wireless communication apparatus according to claim 4, wherein the quantities of the parity data of the first data generated by the data generating section and the parity data of the second data generated by the data generating section reflect the difference in the propagation quality between the base station and each of the wireless communication apparatuses.

6. The wireless communication apparatus according to claim 5, wherein the quantity of the first initial transmission data of the first data in transmitting the first initial transmission data of the first data to the base station reflects the difference in the propagation quality between the base station and each of the wireless communication apparatuses.

7. A wireless communication apparatus that cooperates with another wireless communication apparatus to relay data to a base station, the wireless communication apparatus comprising:

a storage section that stores first data to be transmitted from the wireless communication apparatus;

a receiving section that receives second data to be transmitted from the another wireless communication apparatus;

the receiving section being configured to receive propagation quality information from the base station about propagation quality between the wireless communication apparatus and the base station, and also being configured to receive propagation quality information from the base station about propagation quality between the another wireless communication apparatus and the base station;

a first determination section that determines whether or not a difference in the propagation quality between the base station and each of the wireless communication apparatuses is equal to or greater than a predetermined value based on the propagation quality between the base station and the wireless communication apparatus received from the base station and the propagation quality between the base station and the another wireless communication apparatus received from the base station;

a second determination section that determines which of the propagation quality between the base station and the wireless communication apparatus and the propagation quality between the base station and the another wireless communication apparatus is satisfactory based on said determined difference;

a data generating section that generates first parity data from the first data on the basis of the determination results of the first determination section and the second determination section, and generates second parity data from the second data on the basis of the determination results of the first determination section and the second determination section;

a first interleave section that interleaves the first data and the second data;

a second interleave section that interleaves the first parity data generated by the data generating section and the second parity data generated by the data generating section in accordance with information regarding the difference in the propagation quality between the base station and each of the wireless communication apparatuses; and a transmitting section that transmits at least a portion of the first data which has been interleaved, the second data which has been interleaved, the first parity data which has been interleaved, and the second parity data which has been interleaved to the base station.

8. A wireless communication method for relaying data to a base station by cooperating with another wireless communication apparatus, the wireless communication method comprising:

storing first data to be transmitted from a local wireless communication apparatus in a storage device;

receiving at least a portion of second data to be transmitted by the another wireless communication apparatus using a receiving section;

obtaining a propagation quality indicator of propagation quality between the local wireless communication apparatus and the base station;

obtaining a propagation quality indicator of propagation quality between the another wireless communication apparatus and the base station;

automatically determining a difference of the propagation quality indicator of the propagation quality between the another wireless communication apparatus and the base station and the propagation quality indicator of the propagation quality of the local wireless communication apparatus and the base station using a determination section;

compensating for at least a portion of the first data and the second data for cooperative relay in accordance with the difference of the propagation quality indicators using a relay data processing section; and transmitting data in which at least a portion of the first data and the second data has been compensated to the base station using a transmitting section, wherein said cooperative relay of the second data to the base station is provided by said wireless communication apparatus concurrent with the wireless communication apparatus performing wireless communication of the generated and stored first data.

9. A wireless communication method for relaying data to a base station by cooperating with another wireless communication apparatus, the wireless communication method comprising:

storing first data transmitted from a local wireless communication apparatus and constituted by first initial transmission data including a systematic bit and first parity data including a parity bit in a storage device;

receiving second initial transmission data transmitted from the another wireless communication apparatus, and the second initial transmission data including a systematic bit;

receiving propagation quality between the local wireless communication apparatus and the base station using a receiving section;

receiving propagation quality between the another wireless communication apparatus and the base station using the receiving section;

determining whether or not a difference in the propagation quality between the base station and each of the wireless communication apparatuses is equal to or greater than a predetermined value based on the propagation quality between the base station and the local wireless communication apparatus received from the base station and the propagation quality between the base station and another wireless communication apparatus received from the base station using a determination section;

generating parity data of the first data using a data generating section, in which the difference in the propagation quality between the base station and each of the wireless communication apparatuses is reflected, and parity data of the second data, in which the difference in the propagation quality between the base station and each of the wireless communication apparatuses is reflected, from the first initial transmission data of the first data and the second initial transmission data transmitted from the another wireless communication apparatus when it is determined that the difference in the propagation quality between the base station and each of the wireless communication apparatuses is equal to or greater than the predetermined value;

applying interleaving to the parity data of the first data, in which the difference in the propagation quality between the base station and each of the wireless communication apparatuses is reflected and the parity data of the second data, in which the difference in the propagation quality between the base station and each of the wireless communication apparatuses is reflected using an interleaving section; and transmitting data which has been interleaved to the base station using a transmitting section.

10. A wireless communication method for relaying data to a base station by cooperating with another wireless communication apparatus, the wireless communication method comprising:

storing first data to be transmitted from a local wireless communication apparatus in a storage device;

receiving second data to be transmitted from the another wireless communication apparatus using a receiving section;

receiving propagation quality between the wireless communication apparatus and the base station using the receiving section;

receiving propagation quality between the another wireless communication apparatus and the base station using the receiving section;

using a determining section for determining whether or not a difference in the propagation quality between the base station and each of the wireless communication apparatuses is equal to or greater than a predetermined value based on the propagation quality between the base station and the local wireless communication apparatus received from the base station and the propagation quality between the base station and the another wireless communication apparatus received from the base station;

generating first parity data from the first data on the basis of the determination result using a data generating section;

determining which of the propagation quality between the base station and the local wireless communication apparatus and the propagation quality between the base station and another wireless communication apparatus is satisfactory using another determining section;

generating second parity data from the second data on the basis of the determination result using a data generating section;

interleaving the first data and the second data using an interleaving section;

interleaving the first parity data and the second parity data in accordance with information regarding the difference in the propagation quality between the base station and each of the wireless communication apparatuses using another interleaving section; and transmitting at least a portion of the first data which has been interleaved, the second data which has been interleaved, the first parity data which has been interleaved, and the second parity data which has been interleaved to the base station using a transmitting section.

* * * * *